United States Patent [19]

Cohen-Levy

[11] Patent Number: 5,355,497
[45] Date of Patent: Oct. 11, 1994

[54] FILE DIRECTORY STRUCTURE GENERATOR AND RETREVIAL TOOL WITH DOCUMENT LOCATOR MODULE MAPPING THE DIRECTORY STRUCTURE OF FILES TO A REAL WORLD HIERARCHICAL FILE STRUCTURE

[75] Inventor: Leon Cohen-Levy, New York, N.Y.

[73] Assignee: Physiotronics Corporation, New York, N.Y.

[21] Appl. No.: 896,514

[22] Filed: Jun. 10, 1992

[51] Int. Cl.[5] .......................... G06F 15/40; G06F 9/44
[52] U.S. Cl. .................................... 395/700; 395/600; 364/DIG. 1; 364/280; 364/282.1; 364/283.1; 364/283.2
[58] Field of Search ............... 395/700, 650, 600

[56] References Cited

U.S. PATENT DOCUMENTS

| | | | |
|---|---|---|---|
| 4,130,867 | 12/1978 | Bachman et al. | 364/200 |
| 4,205,371 | 5/1980 | Feather | 364/200 |
| 4,555,771 | 11/1985 | Hayashi | 364/200 |
| 4,631,664 | 12/1986 | Bachman | 364/200 |
| 4,635,189 | 1/1987 | Kendall | 364/200 |
| 5,241,620 | 8/1993 | Ruggiero | 395/22 |

*Primary Examiner*—Kevin A. Kriess
*Attorney, Agent, or Firm*—Kenyon & Kenyon

[57] ABSTRACT

A file directory structure and retrieval system for use in a computer that operates according to an operating system program and an application program. The memory of the computer stores files in a directory structure. A document locator module maps the directory structure of the files stored in the memory to a real world hierarchical file structure of files and directories. The mapping is independent of conventions of the operating system. The document locator module can create, move and delete files and directories without exiting the application program. An open module operates in the background of the application program and intercepts control of the processor when a command is executed to cause a file to be opened. The open module displays on the output device an open card to allow entry of information relating to the contents of the file and location of the file in the real world hierarchical file structure of the file. It causes the file to be opened. A save module operates in the background of the application program and intercepts control of the processor when a command is executed to cause the application program to request information about a file to be saved. The save module displays on the output device a save card to allow entry of information relating to the file. It also causes the file to be saved.

28 Claims, 22 Drawing Sheets

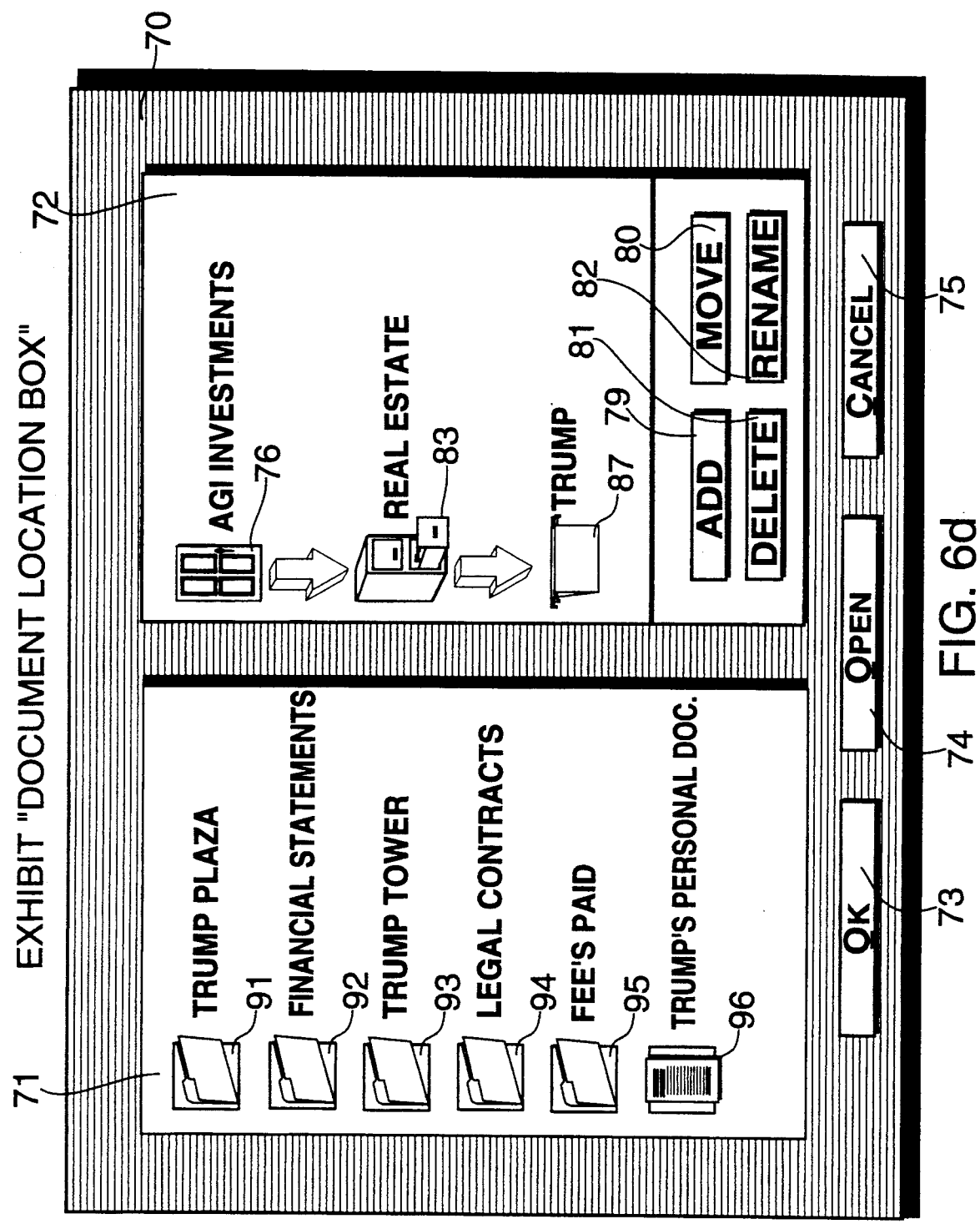

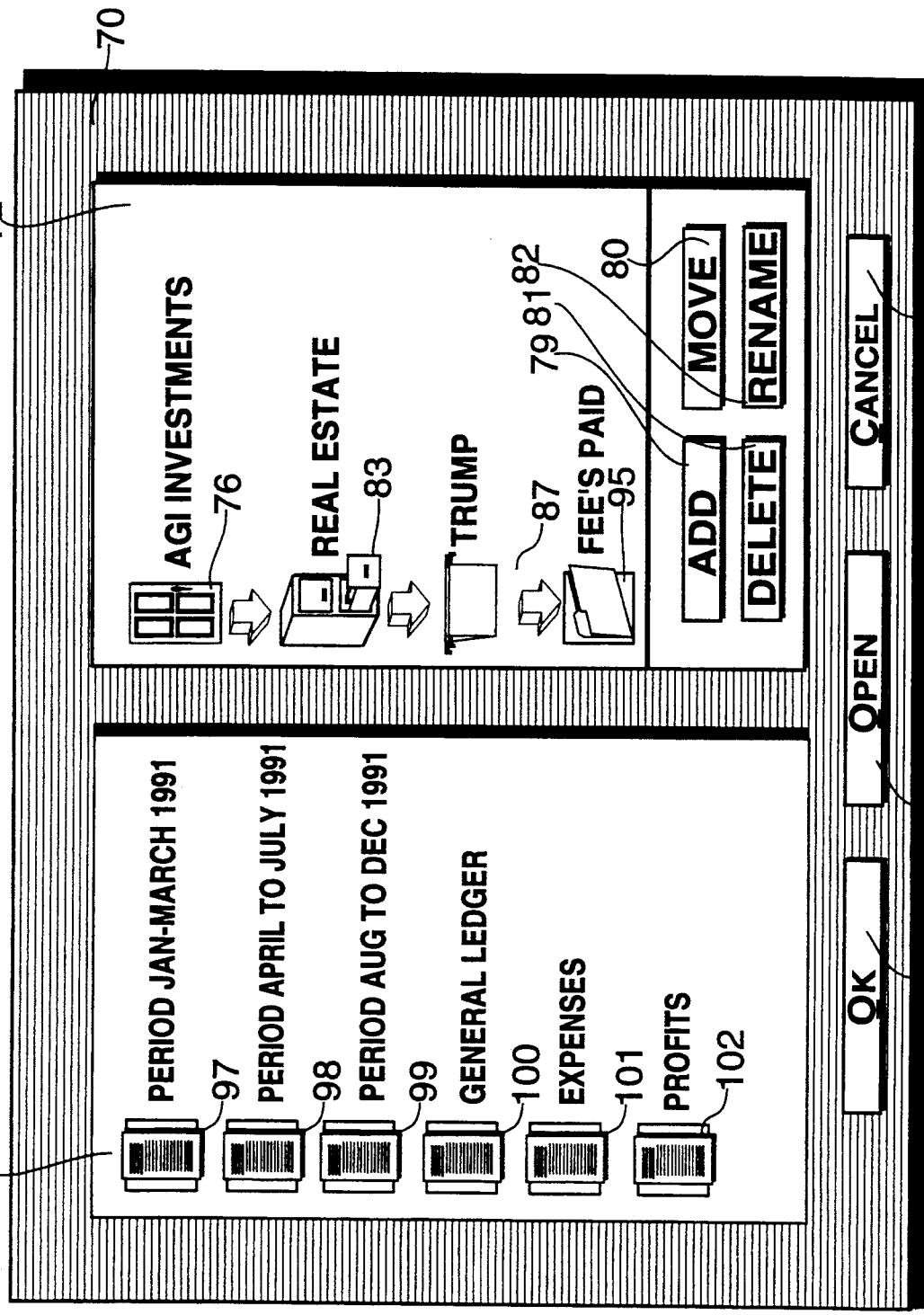

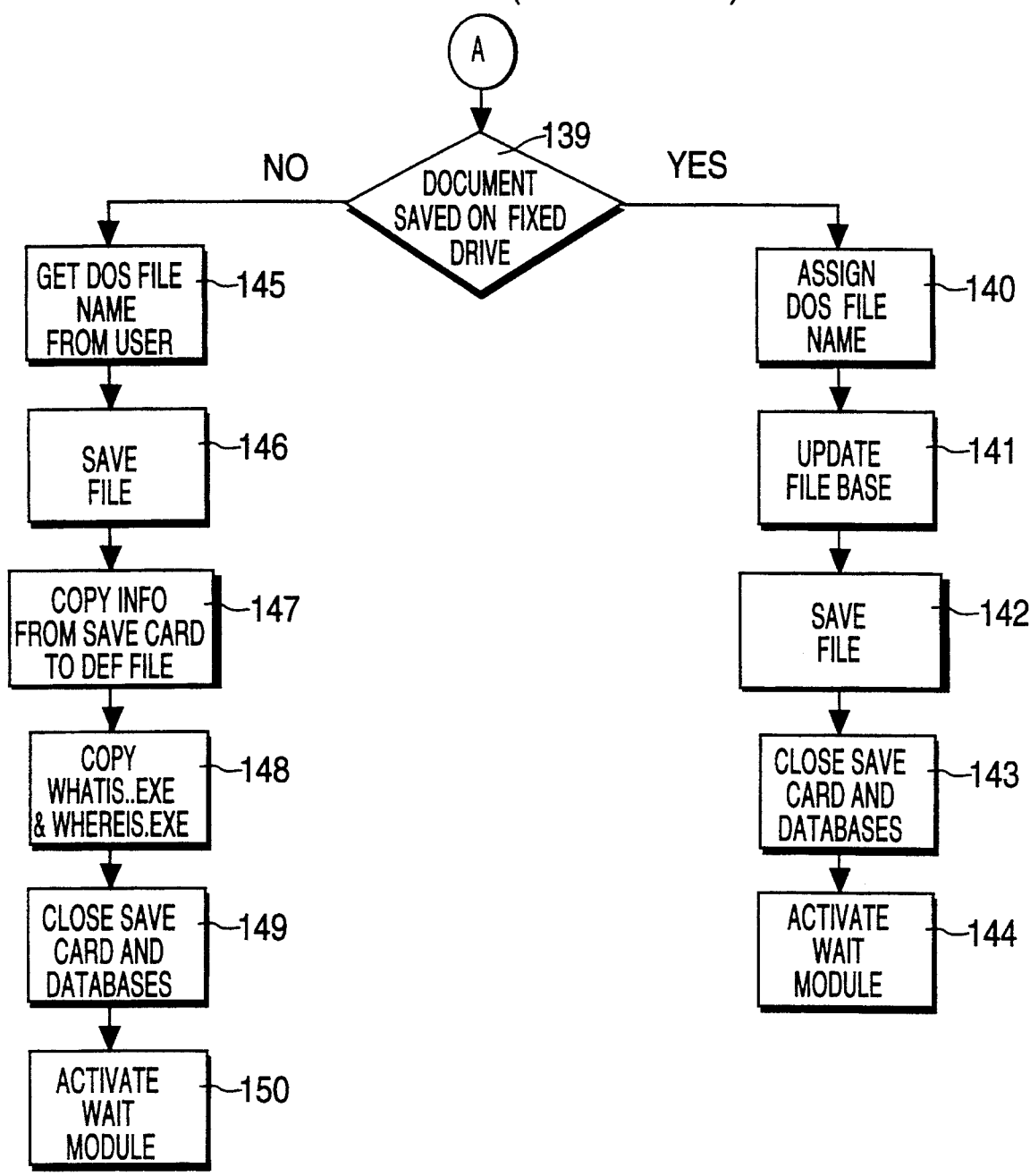

FIG. 11

Database Name: FILEBASE
Structure:

| FieldName | Character or Date | Length | Description |
|---|---|---|---|
| FILENAME | C | 8 | DOS filename for documents |
| EXTNAME | C | 3 | File extension name |
| PATHNAME | C | 38 | DOS pathname for document |
| CRTDUSER | C | 25 | Creating user |
| MDFDUSER | C | 25 | User who last modified file |
| DATECRTD | D | 8 | Date created |
| DATEMDFD | D | 8 | Last modified on |
| APPOWNER | C | 8 | DOS name for creating application |
| APPLPATH | C | 65 | DOS pathname for creating application |
| ICONCODE | C | 1 | Icon code name |
| DATATYPE | C | 1 | Record identifies |
| USERIDNO | C | 25 | User ID |
| RESTITUT | C | 1 | In for restitute [logical] |
| DKEYNAME | C | 25 | Keyword #1 ‖ Directory name |
| DKEYCODE | C | 25 | Keyword #2 ‖ DOS directory name |
| SKEYNAME | C | 20 | Keyword #3 ‖ Subdirectory of (alias) |
| SKEYCODE | C | 20 | Keyword #4 ‖ DOS name of subdirectory of |
| KEYWORDS | C | 20 | Keyword #5 |
| COMMENTS | C | 255 | Comment field |
| CONTNAME | C | 2 | Contact name |
| TYPENAME | C | 2 | Document type name |
| OPTIONPK | C | 2 | Option for save |
| FIELD001 | C | 30 | *Reserved for future use* |

Index Structure for FILEBASE

| TagName | FieldName | Filter |
|---|---|---|
| FBFN | FILENAME | ".NOT. DELETED().AND.DATATYPE='F'" |

FILE DIRECTORY STRUCTURE GENERATOR AND RETREVIAL TOOL WITH DOCUMENT LOCATOR MODULE MAPPING THE DIRECTORY STRUCTURE OF FILES TO A REAL WORLD HIERARCHICAL FILE STRUCTURE

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF INVENTION

The present invention is directed to a computer user interface to allow a user to store files in and retrieve files from a computer's memory, and more particularly, to a computer user interface to organize systematically and intuitively the storage arrangement of files and to enable the retrieval of files in a non-technical fashion using database search techniques.

BACKGROUND OF THE INVENTION

Computer systems generally comprise physical devices including a processing unit, a memory device, a monitor and input-output devices such as a keyboard and a mouse. Computer systems are utilized by users to perform specific tasks or to solve specific problems. Typically, the computer system is programmed to perform these tasks or solve these problems. Such a program is referred to as an application program. Examples of common application programs include word processing programs, data base programs, spread sheet programs, and graphics programs. Application programs, as well as carrying out the programmed function of the application, also provide the user with an interface to enable the user of the application program to communicate with the program. The interface of an application program allows a user to give commands to execute the program's instructions (for example, to underline a word or plot a graph) and to interact with the computer system's operating system (for example, to retrieve a file from memory).

Thus, application programs run in conjunction with the computer system's operating system. The operating system is a program to control the operation of the computer's physical devices. For example, the operating system determines where in memory a piece of information is to be stored, coordinates the sending of information to a printer to be printed, and commences the operation of an application program. Operating systems also provide the user with an interface to communicate with the operating system. Commonly, the operating system's interface is a command line on the computer's monitor where the user can enter an instruction from the operating system's instruction set.

The instruction set usually contains simple instructions to manipulate memory, control peripheral devices and run applications programs. For example, operating systems often have instructions that allow the user to do such things as display the contents of a memory device on a computer screen, delete items of information from a memory device, place items of information in a memory device, organize the information stored in a memory device into simple structures such as hierarchical directories, run application programs and have information printed. A common operating system for personal computers is the MS-DOS operating system (Microsoft Disk Operating System).

Users often find such operating systems difficult to use. The types of commands available are few and unsophisticated. Commands are often abbreviated words, making it difficult for users to remember what a command does and when to use it. Additionally, the user has limited methods to store and structure the user's information in the memory device and limited ways of identifying (or naming) such information. The methods used to store the information are often not user friendly and the data structures in which the information is stored are difficult to manipulate.

The user's information, stored in a memory device, such as a hard disk drive, is often represented by less than meaningful names identifying that information. For example, in the MS-DOS operating system a user's information is stored as a file of information, and that file is identified by a string of up to eight characters followed by a period followed by three characters representing the type of information stored. A typical file identifier in the MS-DOS operating system would thus be "Leonlet.doc", where the first part of the file name is an identifier selected by the user and the second part of the file name identifies the type of file and is generally determined by the operating system or application program. In the example above, the second part of the file name identifies the file as a word processing document.

When using such cryptic file identifiers, many users find it difficult to remember in which file a particular piece of information is stored. The file identifier gives little information to the user about the kind of information stored in the file. Further, the 'dot convention' used in identifying MS-DOS operating system files is unfamiliar to most users, who do not understand what each suffix in the file identifier means. Others operating systems have equally cryptic file naming conventions. It should be noted that application programs are named and stored by the operating system using the same conventions. The file name for the Wordperfect brand word processor application program, for example, is "WP.EXE". This file stores the code for the Wordperfect application program. Additionally, the file name is used as an operating system command to execute that application program.

A further problem user's find when interfacing with an operating system is the way the operating system allows the user to structure stored information. To enable a user to retrieve a file from memory and to provide additional information about the contents of a file (apart from the information given by the file name), operating systems often allow a user to structure the way the files are stored. It is common to provide users with the ability to create directories and subdirectories so that files of information can be grouped in storage with related information.

For example, a user may decide that a directory called "customer" and another directory called "vendors" is desirable. The user can create those directories and then "put" files in those directories. By "putting" a file in a directory, the user is in effect enlarging the filename for the file. For example, the identifier for a file called "address.wrd" stored in the "vendors" directory would be "c: \ vendors \ address.wrd." (The "c" at the beginning of the file name specifies in which storage device the file is stored.) If subdirectories are used, the file name is even more complex. Although providing the user with more information about a file (i.e. that the addresses filed stores the addresses of the user's vendors), the notation used is difficult for inexperienced users to understand. When identifying a file, the user must generally give the full name of the file, thus requiring the user to remember in which directory and subdirectory the file is placed. However, when many files have been stored in a memory device, each with such a cryptic name, it is difficult to locate the desired file and to determine the contents of the various files.

Further, users are given no help in determining what directories and subdirectories are needed, in creating the directories structure and in deciding which files should be placed in which subdirectory. Many users, finding the process of creating directories and placing files in directories too complex, do not bother to use the operating system's directory features. Accessing and creating different directories and subdirectories is clumsy, using meaningless commands such as "cd . . .". When a list of files is displayed, all files are displayed at the one level. The hierarchical directory structure is not explicit in such a listing of files. The notation used in the directory structure, moreover, consists of a series of directory names and file identifiers joined by "/" and ":" characters. Such notation does not relate to the user's real world environment.

To overcome the problem that inexperienced users find when communicating with an operating system program, other programs have been written to provide an easier user interface that performs operating systems functions. The most successful of these advanced operating systems is Microsoft's Windows brand program that provides a graphical user interface for the MS-DOS operating system. Windows is a shell program that converts the MS-DOS operating system environment into a graphical environment. Functions such as "save," "copy," "create directory," "run a program," and the like are simplified by giving the user a graphical interface which the user can operate by means of a cursor on the monitor moved by a physical device such as a mouse. The user's commands from the graphical interface are converted into MS-DOS operating system commands by the Windows program. The program is easy to learn and simple to use. The user needs no knowledge of the difficult MS-DOS operating system conventions and commands. A further advantage of the Windows system is that it offers a standard interface that can be used by various application programs. Application programs can be written to take advantage of the Windows program so that the user sees and operates the same Windows graphical interface for each application program used. In that way, the user can use one series of "graphical commands" for both the operating system and all application programs.

For example, the graphical user interface of the Windows program allows a user to access files stored in memory from both an application program or from an operating system screen using the same command. At the top of each screen on the computer's monitor is a menu bar giving groups of possible commands. When the cursor is placed up on the word "file" on the menu bar and the button on the mouse is activated, different file command options such as "open," "new," "save," and "exit" are displayed below the word "file" on the menu bar. By moving the mouse so that cursor is placed on the required command, which is highlighted, the user can activate a button on the mouse to select that command. In this way, the user does not need to learn difficult MS-DOS operating system command abbreviations because all possible commands are displayed in natural language in the menu. In addition, the same operating system functions can be accessed from various application programs using the same method.

However, software utilizing the Windows program or other graphical user interfaces are limited by the underlying operating system. For example, the Windows program operating under the MS-DOS operating system is limited by certain characteristics of the MS-DOS operating system. Even though file manipulation functions such as "new," "open," "close," "save" and "save as" are presented to the user in a graphical way, the file identifiers used in conjunction with these commands are still the dot notation identifiers of the MS-DOS operating system. The Windows program graphical user interface makes it easier for the user to activate file manipulation commands, but the names used to identify the files are still those that are used by the MS-DOS operating system.

For example, when the user selects the "open" command from the Windows program, a box appears on the screen listing a mixture of MS-DOS operating system files and directories in no particular order or structure. The user is able to open one of these files by placing the cursor on the file name and activating a button on the mouse. The directory structure is not graphically displayed on the screen. The listing just shows a mixture of directories and files, not giving any information about the contents of these directories or files apart from that of the cryptic MS-DOS operating system file identifier. Even though the graphical user interface of the Windows program is based on the principal that commands should be based on actions manipulating graphical worldly metaphors rather than entering cryptic commands, the file names and retrieval operations presented to the user do not create an environment molded to match the user's physical world.

The Windows program does not provide an easy to use tool to create a meaningful real world based file storage structure. For example, a user who wishes to save a document in a file is given no help as to how to name the file, is limited as to the format of the file's name, and is not encouraged to place the file in a relevant directory. More troublesome, the user cannot create a directory using the Windows program from an application program, as explained below. Further, properly arranging the secondary memory into a meaningful directory structure using the file manager programs currently provided by operating systems, such as the MS Windows File Manager program, is a lengthy manual process which requires a good operating knowledge of the operating system. This presents a difficult and challenging task for a novice user. Most users will end up working with a disorganized data and file structure.

This situation results in nonefficient management of secondary memory, creating serious difficulties for the user in retrieving and storing files. As more and more files are stored on the computer, secondary memory becomes cluttered with unrecognizable documents and misleading file directories. Extensive (and expensive) disk space will be occupied by files that the user does not know the contents or relevance of, and which may be obsolete, reducing the efficient use of the computer as a file storage device.

When a user is operating the computer from the operating system level, a common requirement is to locate a file of data, open that file and operate upon it using an application program. Interfaces such as those of the MS-DOS operating system and the Windows program do not help users find the required file. All that is provided to the user is a list of almost meaningless file names. The contents of each file is a mystery to the user until the file is opened. Thus, to locate a relevant file, the user must look at a list of meaningless file names, and open each file in conjunction with the respective application program until the right file is located. When many files are involved, this is a time consuming process. No information, apart from the file name, length of the file and date of first creation is presented to the user about a file when examining the contents of a memory device.

A further problem encountered by users is using an operating system's file management techniques from inside an application program. Once the application program is in use, manipulation of the file structure is very difficult. Even sophisticated graphical user interface programs operating in conjunction with application programs do not allow users to create directories and delete groups of files or directories while inside the application program. For example, if a user is using a word processing program and decides to save the document but the directory the user wishes to save the document in has not been created, the user is unable to both create a new directory and save the document without leaving the word processing application program. In addition, if the user wishes to delete a directory and all the files of information stored within that directory, the user must delete each file individually and then leave the application program to delete the directory.

Not all computers, of course, have the same graphical user interface. A user can save a file on a secondary storage device, such as a floppy disk, and move that file ("the exported file") to another computer that does not use the same interface. As yet, no program has allowed users to automatically transfer, along with the exported file, a file containing information about the exported file. When on another computer system, the only information about the exported file transferred to this system is the minimal information supplied by operating system.

SUMMARY OF THE INVENTION

The present invention provides a computer user interface to create a file structure based on a user's physical world and to provide a tool so that a user can easily locate, find information about the contents and access files that are, or have been previously, stored in the file structure.

The present invention generally comprises five modular components. The first component is an install module. This module helps the user to create a real world hierarchical file structure. In one embodiment, the install module operates as a step-by-step interactive dialogue with the user to create a file structure for the user, based on the user's physical environment. In an other embodiment, the install module gives the user the choice of viewing a tutorial "slide show" that explains the real world hierarchical file structure. In a further embodiment, used in a network environment, all available drives and the real world hierarchical file structure are displayed in the hierarchical structure on the screen to allow the user to see and understand the network' file and storage structure.

The second component is an open module, used to find and open stored files. The open module controls an open card which is an interface that is displayed on the computer screen so that the user can enter information about the file the user wishes to open or locate. The open card also gives the user detailed information about files that have already been stored including information on the location of a file within the real world hierarchical data structure.

The third component is a save module, used to save and store files in the real world hierarchical data structure. The save module controls a save card which is an interface that is displayed so that the user can enter information about the file the user wishes to save.

Both the open card and the save card can be displayed on the computer's monitor while the application program is running. The open card and save card can be accessed without the user having to leave the application or to understand the underlying operating system, its instruction set and its file naming conventions. Further, both the open card and save card allow the user to access a Document Location Box that gives a graphical representation of the real world hierarchical data structure and allows users to manipulate the structure in a comprehensive but simple fashion.

The fourth component is a WHATIS module that automatically exports information about a file and its contents when that file is saved on an external memory device such as a floppy disk. In addition, the WHATIS module automatically transfers an operating system operable command, for example, a WHATIS.EXE command, (and its related program) so that users can access this exported information when using a system that does not contain the first three modules.

The fifth component is a WHEREIS module. The WHEREIS module also exports information about a file and its contents when that file is saved on an external memory device. Alternatively, the WHEREIS module can use the information exported by the WHATIS module, as explained above. The WHEREIS module also automatically transfers, on the save operation, an operating system command (and its related program) so that users can search for categories of files by searching the exported information using queries that search the exported information.

It should be noted that the present invention can operate with only the first three modular components, or with the first three modular components and either the fourth or fifth modular component.

In one embodiment, the present invention is used in conjunction with the commercially available graphical user interface program, Windows 3.0. When the Windows 3.0 program is being used, the present invention operates in the background so that the open card and the save card are available whenever the user executes a command to save or to retrieve a file. Thus, the user does not know that the present invention is in operation until it is required to be used. The present invention is not limited, however, to the Windows 3.0 interface or the MS-DOS operating system.

The present invention does not use the DDE interface of the Windows 3.0 program. The DDE interface allows program developers to write macros that rely on the Windows 3.0 program's protocols. So that the first three modules described above are compatible with as many application programs as possible, and not just those that use the DDE protocols, the save module and the open module are activated whenever the application program attempts to display its save or open "dialogue" box.

The install module is used when the user wishes to create a file structure based on the physical organization of the user's real world. The install module is activated when the user installs the present invention on a computer's hard disk drive.

In one embodiment, the install module activates an interactive step by step dialogue with the user, asking the user a list of simple questions. Each of the questions may be accompanied by an illustration, such as a picture, a chart or an explanation, to highlight the importance of the question and to help the user understand the question so that the most accurate answer will be given. The answers the user gives to the quiz are used to create a file structure based on the physical organization which the user is familiar with in the real world, called the real world hierarchical file structure.

In another embodiment, the install module gives the user the choice of viewing a tutorial "slide show" that explains the real world hierarchical file structure. The user can directly create the real world hierarchical file structure buy using the features of the Document Location Box, as explained below.

The present invention enables each level of the real world hierarchical file structure to be created based on real world objects so that the user does not have to understand the physical operation of the computer's storage system, directory structure and operating system. Levels in the hierarchy may represent real world objects. For example, instead of having to understand the concept of a directory, the user is able to store files in an object representing a real world storage device, such as a file cabinet. The real world hierarchical file structure will be generated based on the user's real world objects and storage devices, i.e. file cabinets will contain green folders which will in turn contain manilla folders which will in turn contain soft folders which will in turn contain the actual files. The user may, depending on the complexity of the user's real world organization of information, increase or decrease the number of levels in the real world hierarchical file structure. The actual files may be in any level in the hierarchy. Each level, such as the file cabinet or the green folder, will have associated with it a pictorial icon that looks like the associated object. By activating these icons, the user can easily move through the hierarchy and store and retrieve files.

In addition, instead of forcing the user to understand the concept of storage devices, such as disk drives, and naming conventions for storage devices, the user will simply be presented with a door icon representing each storage device. Thus, each storage device is made part of the real world hierarchical file structure and users can move between storage devices in the same way as between files.

In one embodiment, the install module quizzes the user to find out how many levels in the real world hierarchical file structure the user requires and what these levels should be called. For example, the user may be asked how many activities the user is involved with. The question will be accompanied by a description helping the user determine what an activity is and the best way to identify each of the user's activities Technically, the answer to the question will create the first level in the real world hierarchical file structure and the first level of directories in the operating system's directory structure. Each of the directories at this level will be represented by the same real world icon, such as a file cabinet. This module will create one item (e.g. one file cabinet) for each activity. The user will be asked to name each activity. The names the user can assign to these activities, or file cabinets, will not be limited to the eight character or the MS-DOS operating system format for file and directory identifiers. Any word, combination of words or sentence can be used as the item name. Thus the combination of having an icon representing a real world object as the place that the file is stored and a meaningful name for the file will enable the user to structure and find files easily and with greater flexibility.

Next, the user will be quizzed by the install module on each activity (or first level object) to determine how many parts (or items) the user wants to split that activity into. Technically, the answer to this question will create the first level of subdirectories from the file cabinet level. In this example, each of the subdirectories will be represented by a green folder icon. The user will not be aware of this technical process, but will see one green folder created for each of the parts for each activity. The user will then be asked to name each part. Information will be displayed on the screen to help the user determine the name for each part. This process will continue, with the user being asked for each part, how many tasks make up this part. The system will use this to create a second level of subdirectories for each item at the green folder level of the real world hierarchical structure. Each of the second level of subdirectories will be represented, in this example, by a manilla folder icon. The process will continue down the real world hierarchical file structure creating other levels, represented by physical objects such as soft folders and finally icons representing the files themselves, until the user is satisfied with the file structure created.

In another embodiment, where the user directly creates the real world hierarchical file structure, the same file structure as explained above can be created, but the user is not directly guided by the install module in its creation.

It should be noted that each level in the hierarchical file structure is represented by a real world object and an associated icon featuring that object. The user is not limited to the MS-DOS operating system naming conventions for each level in the directory hierarchy and does not have to understand how directories are created by the MS-DOS operating system.

The organizational structure the user is familiar with in everyday life influences the directory file structure which is designed to enable the user to reflect his or her real world activities. This file structure can be used for both simple file structures for the single user as well as sophisticated multi-layered file structures stored on a network for multi-national corporations.

Any time that the Windows 3.0 program is in operation, the present invention remains inactive until it is triggered by the user selecting a nominated Windows 3.0 command. If the user selects a "save" or "save as" command from an application program that this invention recognizes (which means the user wishes to save the document which is currently being operated upon by the application program) or if the user indirectly triggers a save command (for example, by exiting from the application program without first saving the document being operated upon by the application program), such that the application program requires information from the user to save the document, the save module automatically comes into operation and a save card appears on the screen. When the application program does not require information from the user (as for example when the document has been previously saved and the information required has already been provided by the user), the save module is not activated. Thus, whenever the application program would usually display its save box, the save module intercepts and causes to be displayed the save card of this invention.

If the user had previously created and filed the document in the real world hierarchical file structure created by the install module (for example, by previously saving the document when the system of the present invention was in operation) and the application program would usually display its save box to obtain information from the user, then the save card will be displayed on the screen instead showing the relevant information that the user had previously entered about the contents and creation of the file to be saved. That information is stored in a database, called a File Base, containing information about each file saved, its MS-DOS operating system filename assigned by the save module and its position in the real world hierarchical file structure. However, if this is a new document that had not previously been saved, or if the user is saving a document the has not been previously stored in the real world hierarchical file structure (for example, because the file has been transferred from another system or is a file created before the present invention was installed), the save card will show a series of buttons on the save card. These buttons contain headings (or field names) about information the user may wish to enter concerning the file to be saved to identify it, identify its contents, and simplify the retrieval of the file. The buttons that appear are fields with field names corresponding to certain fields in the File Base. The field names identify topics of information about the file to be saved. The user enters information about the topic on its respective button, as explained below.

In one embodiment, when a user places the cursor on one of the buttons on the save card and selects the button by, for example activating a physical button on a mouse, the field name in the button will be replaced by a blank space in which the user can enter the desired information. In another embodiment, the button is a blank field with the label name nearby. Examples of buttons that may appear on the save card include a user ID button, where the user may enter the name of the person who created the file, a contact button, where the user may enter the name of the person to whom the information in the file may be sent (for example, if the file contains a letter, the name of that person to whom the letter is addressed), a regarding button (or document description button), which allows the user to enter text commenting upon the file, a key words button, allowing the user to enter five separate key words concerning information on the file to help the user retrieve that file at a later date, a type-of-document button in which the user can enter the physical type of document which the file contains (for example, a letter, a spreadsheet, a graph, a report), an options button, that allows the user to save the document in a specific format acceptable by the application program, and importantly, a document location button, which when activated by the user displays a box, called a Document Location Box, on the monitor to allow the user to choose the level in the real world hierarchical file structure where the document is to be stored.

As a further improvement, when certain buttons on the save card are activated, a list of options for that field can be displayed. For example, if the type-of-document button is activated, the user may be presented with a list box containing all known document types in the system from which the user may choose the document type to be entered on the save card, and thus into the File Base. Similarly, if the user ID button is selected, a list box containing all users entered in the system is shown, and if the contact button is selected, a list box presenting all the prior contacts entered in the system is shown.

At the bottom of the save card are at least two action buttons that the user activates when finished entering the desired information into the save card buttons. One action button is an OK button which when activated adds a new record to the File Base containing all the information shown on the save card in the respective fields. The OK button can also have other names, such as a save button. The file is saved in the nominated memory device (represented by the selected "door" in the real world hierarchical file structure) and control returns to the application program. The computer user interface of the present invention then waits until the next time that a recognized command is selected by the user, at which time either the save module or open module is activated.

The second action button on the save card is a cancel button. When this button is activated, nothing is saved in a memory device or the File Base, and control returns to the application program.

Other buttons may exist on this card include an export button (to save a file to a secondary storage device) and an Add button and a Delete button (to manipulate the information displayed in the list box and stored in the File Base.

It should be noted that the user has the option of entering information into each button. The only button which the user is required to complete is the document location button. In other words, the user may decide not to provide any information to be stored in the File Base about a file. As this would make retrieval of the document more difficult in the future, the user is encouraged to enter such information. The document location must be entered so that the operating system knows where to store the document. It should be noted that when a file is saved, the save module assigns a MS-DOS operating system file name to the file which the user does not see and need not know. This MS-DOS operating system file name is stored in the File Base. All future access to the document is through the open card operated by the open module.

The open card will appear on the screen whenever the user selects an open command from the application program or when the user activates the special search command from the operating system level. The open card can be used as a retrieval tool to locate and open files as well as to open the located file's related application program.

The user has the option of activating the open card from the main screen of the Windows 3.0 program by use of the special search icon. This icon/command is used to access directly the file and its related application program. The advantage of using the open card while not in an application program is that, because a user often cannot remember what application program was used to create the file the user desires to access, a general search through all files on the system (in which the user must open the related application program for each file) is avoided and the user can use the open card to locate the desired file from the operating system level and open the required application program in the one operation. For example, a letter the user previously saved may have been created by a word processing application program, such as, e.g., the Word Perfect application program, the Word application program or the Page Maker application program. If all the user can remember is that the letter was addressed to a certain person, the user can activate the open card, search all documents for the required document using the contact button as explained below, and then open that document from the open card. By opening the file from the open card, the correct application program will also be opened at the same time.

The open card (which can also be called the Retrieve card) contains a user friendly interface that enables the user to access files using any combination of identifiers which the user remembers relates to that file. Unlike the open boxes used by the prior art, the user will not have to remember an operating system file identifier or directory identifier to retrieve the required file. The open card contains a series of buttons with field names that relate to fields in the File Base. If the user knows some information about the file required to be retrieved, the user may activate the button that represents that topic of information and enter that information in the button. Alternatively, if a user activates certain buttons, the user will be presented with a list box containing all the items of information that could be stored in that field. For example, if the user activates the type-of-document button, the user will be presented with a list box containing all document types in the system. By selecting information from one of the list boxes, or by entering the information directly onto the button, the user will be able to provide parameters for a search of the File Base by which the file required to be retrieved can be located.

Examples of buttons that appear on the open card include a begin-date button and an end-date button which allow the user to enter a date or a range of dates during which the required document was created, a user ID button, a document location button, a contact button, a type-of-document button, a keywords button, and a regarding (or document description) button.

By activating the begin-date button, a calendar of the current month will appear with the current data underlined by a blinking cursor. The user will move the blinking cursor using a pointing device, such as a mouse, to select the date. It is important to understand that each time the user creates a document, the save module will assign a date of creation to the document which is independent of the operating system assigned creation date. Thus, if the user remembers that the document was created in a certain week, the user can enter the first day of the week in the begin-date field and the last day of the week in the end-date field and all documents created between those two dates will be retrieved.

The user ID button on the open card allows the user to retrieve documents by a user's identity. The contact button allows the user to retrieve all documents sent or addressed to another person. The keywords button allows the user to retrieve documents based on the keywords that have been previously entered concerning the document. A regarding button allows the user to search on any word or string of words previously stored regarding the file. The type-of-document button allows the user to search on the types of physical documents recognized by the system. The document location button presents the user with the Document Location Box, which allows the user to choose the desired file directly from the real world hierarchical file structure, by allowing the user to traverse the graphical representation of the real world hierarchical file structure. This is explained in more detail below.

When the user has entered information about the file to be retrieved in the relevant buttons, the user will activate a search button on the open card which causes the open module to search the File Base for any matches to the data entered on the open card. All matching files (i.e. those files containing information about the files that fulfill the search criteria) are displayed in a scrolling window on the screen. In one embodiment, the scrolling window and the open card are displayed on the screen at the same time. If the user places the cursor on one of the documents listed in the scrolling window, the full information concerning that document which the user had previously entered into the File Base via the save card will be displayed on the open card. In an alternative embodiment, the scrolling window itself displays information from the File Base about the matching files. When the desired document has been located using this method, the user may activate an open button on the open card so that the selected document, and if necessary the application program to be used in conjunction with that document, is opened. Control is passed from the open module to the application program relevant to the opened document. The present invention then waits until the user selects a designated save or open command from the application program.

As mentioned above, the Document Location Box is displayed whenever the user selects the document location button from the open card or the save card. The Document Location Box is a graphical display on the monitor which allows the user to choose the actual level in the real world hierarchical file structure where the document is to be saved or retrieved from.

In a first embodiment, the Document Location Box contains two parts, a select window and a path window. If there is more than one memory device available to the user, icons representing those storage devices will be shown in the select window. In one embodiment, these icons look like doors. Next to each door icon will be a name the user has given to each memory device. The user may then select one of the doors using standard Windows 3.0 methods. That door icon will be displayed in the path window and all file cabinet icons, representing the next level in the real world hierarchical structure, will be displayed in the select window. Each file cabinet icon has the name chosen by the user displayed adjacent to the file cabinet. The user may then select the file cabinet icon in which the document is to be stored in or retrieved from.

That file cabinet icon will then appear in the path window and all green folder icon associated with that file cabinet icon at the next level of the real world hierarchical file structure will be displayed in the select window. The file cabinet icon will be displayed in the path window connected to the door icon so that the user can see the path the user has taken through the real world hierarchical file structure. The user may then select a green folder icon from the select window and associated manila folders will then appear in the select window with the green folder icon now displayed in the path window connected to the file cabinet icon. If a user selects a manila folder icon, that manila folder will appear in the path window and the documents "stored" in that manila folder are displayed on the select window. When any file or level of the real world hierarchical file structure is displayed in the select window or the path window, the icon representing that file or level is displayed along with the name the user has given to that file or level. There is no conceptual limit to the number of levels in the real world hierarchical file structure the user may access. When a level at which a file is stored is reached (rather than another level of the real world hierarchical file structure) a file icon and will be displayed in the select window. That file icon can be selected by the user. If the user has entered the Document Location Box from the open window, then the file icon that the user selects from the select window will have its associated data from the File Base displayed on the open card. The user may then open that document by selecting the open button on the open card. On the other hand, if the user has entered the Document Location Box from the save card, the user may at any stage choose at which level to store the file by selecting the appropriate level in the real world hierarchical file structure. Once that appropriate level has been selected, the user will then activate an ok button on the Document Location Box and the name of the document chosen by the user when placing the file in the real world hierarchical file structure will be entered onto the document location button on the save card.

Any time the user is in the Document Location Box, the user may select an icon from the path window. By doing so, the path window will be modified so that the level represented by that icon will be the level at the end of the path in the path window. In other words, a previous level is selected as the current level. The select window will display the different choices available at the next level to that of the level selected by the user from the path window.

Also, in the first embodiment, the Document Location Box contains four buttons, Add, Move, Delete and Rename. The Add button is used to add a new item at the selected level. First, the user must select a level from the path window. The user then selects the Add button. A new icon is displayed in the select window at the level of the other items in the select window. The user then adds the name of the new item added.

The Move button is used to move an item at one level to a different level in the real world hierarchical file structure. The user highlights an item in the Document Location Box and then selects the Move button. The move button becomes a Move-To button and the user can then select a new item in the Document Location Box where the user wishes to place the selected item.

The Rename button allows the user to rename an item that the user has highlighted in the Document Location Box. The Delete button is used to delete an item and all of its sublevels. The item to be deleted is highlighted by the user, and then the user selects the Delete button. At this stage, a message will appear on the screen asking the user if the user really desires to delete the selected item in all of its sublevels. If the user selects "yes" then that item and all of its sublevels are deleted from the real world hierarchical file structure, and all corresponding entries in the File Base are removed. These functions can be accessed via the Document Location Box without having to exit the application program.

In a second embodiment, the Document Location Box has one window display for each level in the real world hierarchical file structure. Each window display, except the last, displays the path to get to the last displayed level. The last displayed level displays all available choices in the real world hierarchical file structure at that level.

As can be seen from the above description, the computer's file storage mechanism is organized and controlled using the present invention as an interface between the user and the operating system. All documents stored or deleted from memory are added to or deleted from the real world hierarchical file structure via the open or save cards. Any document which was created on another computer and is loaded into the system through an external device such as a floppy disk drive will therefore need to be stored in the real world hierarchical file structure and have information about it stored in the File Base. A file coming from a normal MS-DOS operating system environment will only give information required by the MS-DOS operating system, such as a file identifier of up to 8 characters. The present invention requires more information than this so that the document can be recognized, filed and retrieved in the present invention's real world hierarchical file structure. For that reason, every imported file from an external computer can be imported using the following import procedure.

When loading the file, the document is loaded into memory. The Document Location Box will display an operating system file name list of unrecognized files. By clicking on one of those file names, that document will be displayed on the monitor. Using the Move and Rename buttons in the Document Location Box, the imported file can be renamed and placed in its correct position in the real world hierarchical file structure. Alternatively, when the user first saves the document from inside an application program, the save card will appear and the user only has to fill in the save card in the regular way for the file to be recognized and placed in the real world hierarchical file structure.

The embodiments of the present invention explained above operates in conjunction with the Windows 3.0 program. When the Windows 3.0 program is not in operation, either because the user has decided not to activate it or the user is operating using MS-DOS operating system commands on a computer that does not have access to the Windows 3.0 program, all the above features will be unavailable. The user will have access the file required in the regular MS-DOS operating system way by searching through a directory structure looking for the file name identifier of up to eight characters representing the required file. The file name identifier may be unfamiliar to the user, for example, because the user created the file and has forgotten the contents of the file or because the file was created using the save card where the user has no knowledge of the MS-DOS operating system file name of the file.

The present invention provides a WHEREIS module that controls a WHEREIS command to identify and explain the contents of all files saved using the save card. When the user enters the command "WHATIS name,, at the operating system level, a list and explanation of the contents of all files whose entries in the File Base contain the term "name" in any field will be given. Each file that is saved using the save card, as explained above, will have created for it a MS-DOS operating system companion file, called a definition file. All the explicit information from the File Base is stored in the definition file. This definition file has the same name as the file that it is companion to, except that it will end with a defined suffix such as ".def". The WHEREIS command accesses the definition file for all files that satisfy the search criteria, in this example, "name". Thus, the WHEREIS command will cause the contents of the ".def" files to be displayed on the screen along with the operating system file names of the files the user is inquiring about.

In addition, the present invention also provides a WHATIS module that controls a WHATIS command to identify and explain the contents of all files saved using the save card. When the user enters the command "WHATIS filename,, at the operating system level, an explanation of the contents of that file will be given. Each file that is saved using the save card, as explained above, will have created for it a MS-DOS operating system companion file, called a definition file, as explained above. The WHATIS command accesses the definition file for any file name following the WHATIS command. Thus, the WHATIS command will cause the contents of the ".def" file to be displayed on the screen along with the operating system file name of the file the user is inquiring about.

Further, the user will be able to use all the MS-DOS operating system abbreviations so that several files and the information about those files can be displayed at once For example, if the user types in "WHATIS *.*", the user will be given a listing of all the files in a directory and an explanation of files that have stored information in a companion file. Thus, the WHATIS command is similar in syntax to the MS-DOS "DIR" command, but is more sophisticated in operation in that it provides information that had been stored in the File Base about the files that satisfy the parameters of the command.

When any file that was saved using the save card is copied to another memory storage device, such as floppy disk, its companion definition file will also be transferred. In addition, the programs that execute the WHATIS and WHEREIS commands will be transferred to that storage device. Therefore, when a person transfers the file onto another storage device, that file as well as that file's definition file and the WHATIS and WHEREIS programs will also be transferred.

Thus, for example, the user will be able to identify the contents of the transferred file by typing "WHATIS filename" and all the information that was saved through the save card in the File Base will be displayed on the screen, even though the first three modules of the present invention are unavailable on the system being used.

The user does not need to be using the Windows 3.0 program or have access to the real world hierarchical file structure or any other component of the present invention to use the WHATIS or WHEREIS commands. However, whenever the user is using the present invention in conjunction with the Windows 3.0 program, the user will be able to access and save the transferred file in the usual way using the save card and the open card. It should be noted that a feature of the WHATIS and WHEREIS commands is that they are transferred automatically along with any file created using the save card when that file is copied to a storage device other than the storage device containing the first three modules of the present invention.

BRIEF DESCRIPTION OF THE DRAWINGS

FIGS. 6a to 6e are examples of screen displays generated by the Document Locator module of FIG. 1.

FIG. 11 is a chart of the database fields of the File Base of FIG. 1.

DETAILED DESCRIPTION

Figure 1:
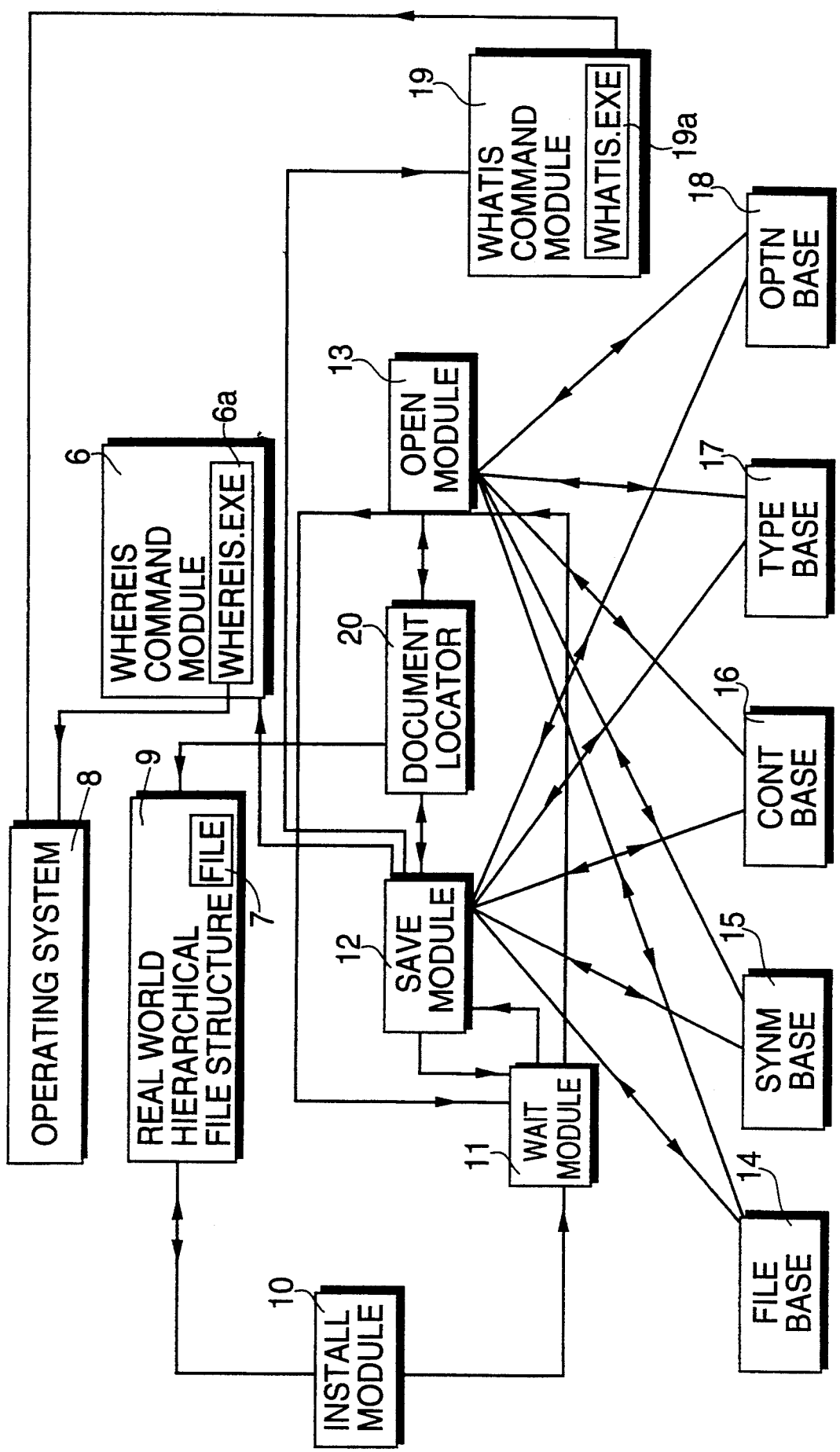
FIG. 1 is a block diagram of the modules of the user interface system of a representative embodiment of the present invention.

Referring now to the drawings, an dinitially FIG. 1, there is illustrated in block diagram form the various modules of a representative embodiment the present invention and the interaction between those modules. When the user first operates the present invention, the install module 10 is activated. The install module 10 in the representative embodiment helps the user create a real world hierarchical file structure 9. The module interactively quizzes the user about the user's real world organizational structures and displays pictures, charts explanations and the like, explaining to the user the relevance of each question to help the user give accurate answers. The answers to the questions are used to create a directory structure in the operating system 8 and the real world hierarchical file structure 9 to enable each file 7 to be located easily.

After the real world hierarchical file structure 9 has been created, in the representative embodiment, by the install module 10, control is transferred to a wait module 11. The wait module 11 is a shell that operates in the background while an application program (not shown) is in operation. The wait module 11 intercepts control from the application program anytime the user gives a "save," "save as," "open" or "exit" command, or from the operating system 8 when the user gives a "search" command. The wait module 11 hides from the user the application program's interface for these commands. (In place thereof, either an open card (see FIG. 4) or save card (see FIG. 2) will be displayed.) The wait module 11 determines whether to pass control to a save module 12 or an open module 13. If the user has requested a "save" or "save as" or "exit" command from the application program, and the application program requires information from the user or requires the user to confirm previously entered information, the save module 12 is activated. If the user has requested an "open" command from the application program (or activated the search command from the operating system 8), the open module 13 is activated.

The save module 12 causes a save card (See FIG. 2) to appear on the screen. If the file 7 has previously been stored within the real world hierarchical file structure 9, the save module 12 will fill in previously stored details about the file 7 on the relevant buttons on the card (see FIG. 3). This information is retrieved from a File Base 14, which contains information the user has stored concerning the file 7. On the other hand, if this is a new file, the user is given the option to enter details about the file 7 on the save card. The save module 12 coordinates this entry of information. For example, if the user wishes to enter information concerning the type of document to be saved, the save module 12 will access a type base 17 and display on the screen a list box containing all known document types. Examples of other databases that can be accessed by the save module 12 to help the user select options concerning the file 7 to be stored include the cont base 16 which contains all known contacts and the optn base 18, which stores all the option formats acceptable to the application program.

When saving a file 7, the save module 12 requires that the user choose an item in the real world hierarchical file structure 9 as the location to store the file 7. The save module 12 therefore transfers control to the document locator module 20 which causes to be displayed on the screen a document location box (see FIG. 6). Using the document location box, as described below the user is able to choose a position in the real world hierarchical file structure 9 as the storage location of the file 7. Once this location has been determined, the document locator module 20 returns control to the save module 12. When the user is satisfied with all options entered into the save card, the save module 12 causes the operating system 8 to save the file 7 in a memory storage device (not shown).

When the user has completed all the desired information on the save card, the save module 12 will cause this information to be stored in the File Base 14. Along with this information, the operating system name and path name for the file 7 will be stored so that the operating system 8 can locate this file 7 in memory at a later stage. Additionally, in the representative embodiment, the save module 12 will signal the WHATIS command module 19 whenever the user saves a document on an external storage medium, such as a floppy disk (not shown). The WHATIS command module 19 will make a hidden directory on this secondary storage medium and will save all the information from the File Base 14 in a condensed ASCII file in the directory related to the file 7 that is saved. Further, the WHATIS command module 19 will copy a WHATIS.exe executable command program 19a to the secondary storage medium. The save module will also signal a WHEREIS command module 6. The WHEREIS command module 6 will copy a WHEREIS.exe executable command program 6a to the secondary storage medium.

The save module 12 will remove the save card from the screen and then returns control to the wait module 11 once the file 7 has been saved. The wait module 11 will then pass control back to the application program until the next "save," "save as," "open" or "exit" command is selected by the user.

When the user selects an "open" command from the application program, or selects the search command while using the operating system 8, the wait module 11 activates the open module 13. The open module 13 will display an open card (see FIG. 4) on the screen. The open card contains a series of buttons (see FIG. 4) which the user may select to give information about the file 7 that the user wishes to retrieve. The user enters the relevant information onto each button. The information entered by the user is used as the search criteria to find files 7 in the File Base 14. When certain buttons are activated, the open module 13 will present a list of possible options from various databases 16 to 18 in a list box (not shown) on the screen. For example, the open module 13 will access the cont base 16 if the user wishes to select one of the contacts available to be used as a search criterion. Alternatively, the open module 13 may access the type base 17, to present a list box containing the document types when the user wishes to search for the desired file 7 based on the type of document in the file 7. If the user searches by key word, the open module 13 will access tile synm base 15 to match synonyms of the key word with words stored in the synm base 15.

Alternatively, the user can search for a file 7 using its location in the real world hierarchical file structure 9. To do this, the user activates the document location button (see FIG. 4) on the open card. The open module 13 will then activate the document locator module 20. The document locator module 20 displays the document location box (see FIG. 6) on the screen and allows the user, as explained below, to identify a file 7 based on its location in the real world hierarchical file structure 9. When the file 7 has been located, the document locator module 20 will return control to the open module 13. Once the user has finished entering information onto the open card, the open module 13 takes the information to search the File Base 14 for each file 7 that fulfills the search criteria. The open module 13 will display each file 7 that fulfills the search criteria in a Documents Found box (see FIG. 5). The user may then select one of these files 7.

When the user selects a file 7 from the Documents Found box, the open module 13 will pass to the operating system 8 the operating system name and path name for the file 7 the user wishes to open. This name and path name is stored in the File Base 14 in the entry related to the file 7 the user has selected. The open module 13 will then remove the open card from the screen. The file 7 that the user has selected will be opened by the operating system 8 and any corresponding application program that is needed will also be opened by the operating system 8. Control is returned to the wait module 11 which will run in the background until the user selects an "open", "save", or "save as" or "exit" command from the application program or the search command from the operating system.

Figure 2:
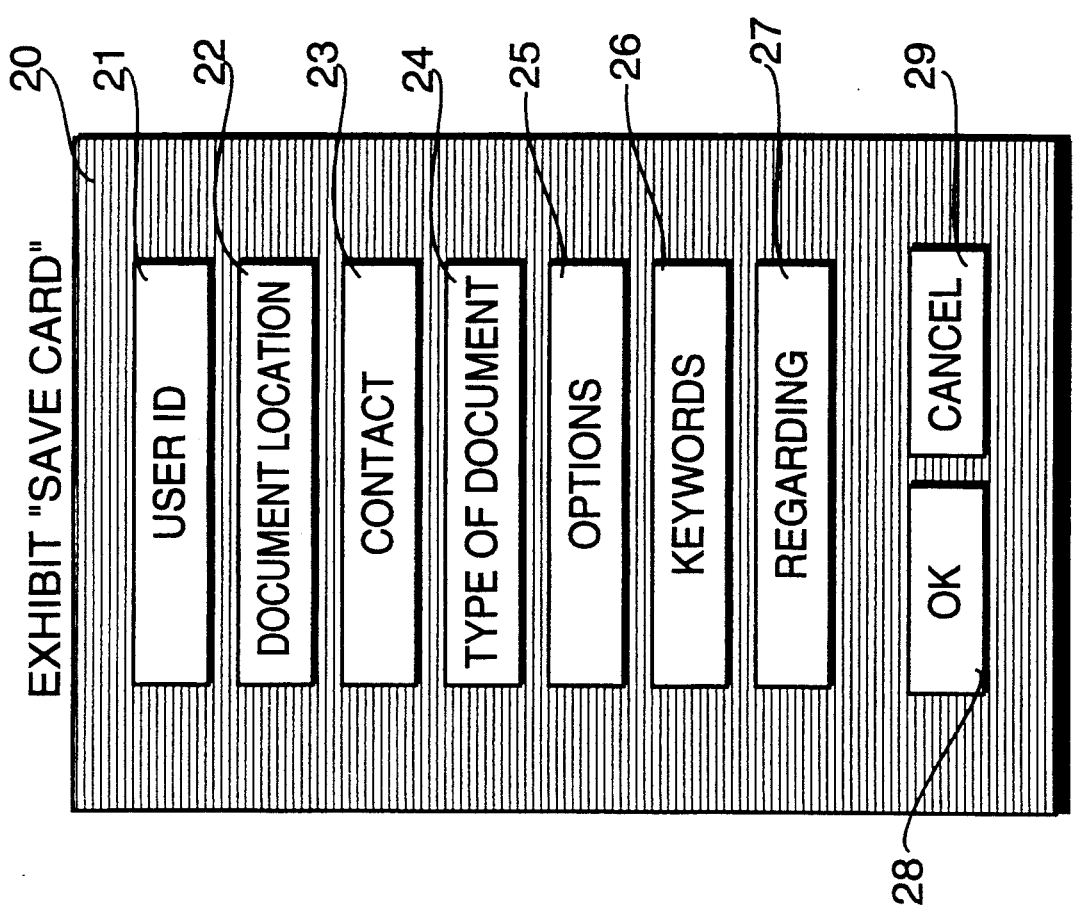
FIG. 2 is an example of the save card displayed by the save module of FIG. 1.

Referring now to FIG. 2, there is illustrated an example of the save card 20 which is displayed by the save module 12 of FIG. 1. The save card 20 shows the various buttons 21 to 27 that could be displayed to the user when the file 7 to be saved is a new file that has not previously been placed in the real world hierarchical file structure 9. The buttons 21 to 27 are examples of the type of information that could be stored by the save module 12 in the File Base 14 for each file 7 in the real world hierarchical file structure 9.

Figure 3:
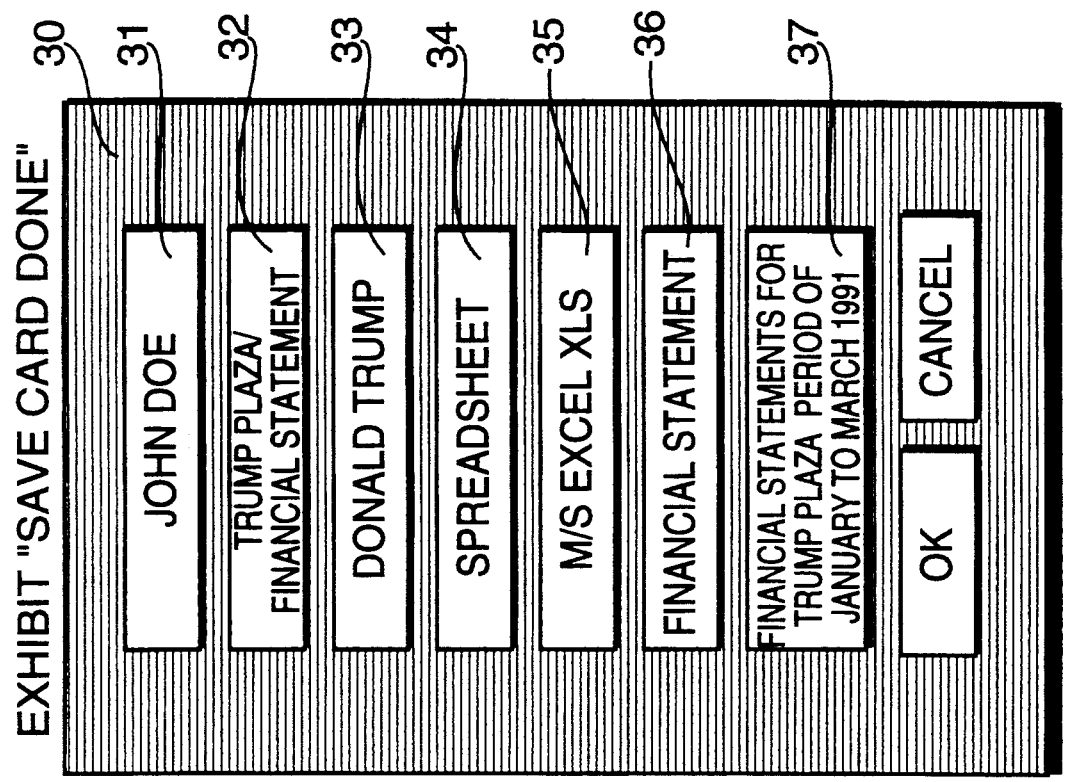
FIG. 3 is an example of a completed save card.

As examples of the type of buttons that could be displayed, there is illustrated a user ID button 21, a document location button 22, a contact button 23, a type-of-document button 24, an options button 25, a key words button 26 and a regarding button 27. When the save card 20 is first displayed for a new document, these buttons contain the description of each button as is shown in FIG. 2. If the file 7 has previously been placed in the real world hierarchical file structure 9, the save card 20 will appear on the monitor containing the saved information from the File Base 14 concerning that file 7 as is shown in FIG. 3.

The user ID button 21 allows the file 7 to be stored as belonging to a selected user. Each user is recognized by the save module 12. Users can be added when needed or deleted as long as no existing file 7 is assigned to that user.

The document location button 22 is used to indicate where in the real world hierarchical file structure 9 the file 7 is located. For example, if the real world hierarchical data structure 9 contains folders the name of the folder into which the file 7 is to be inserted is shown on this button 22. By activating the document location button 22, a document location box as illustrated below in FIG. 6, presents, in the representative embodiment, two for the user to choose the actual position in the real world hierarchical file structure 9 where the file 7 is to be placed.

The contact button 23 is used to enter the name of the person to whom the document in the file 7 is to be sent. The names of the known contacts are stored in the cont base 16.

The type-of-document button 24 is used to enter what type of document the file 7 contains. A list of all known document types in the system is stored in the type base 17.

The options button 25 allows the user to save the file 7 in a format acceptable by the application program. The information entered in the options button 25 depends on the application program. For example, when used with the Microsoft Windows brand program, the Microsoft Windows program saving options will be available as well as the options to specify the type of file to be saved (i.e. TIFF, CBR, EBS).

The key words button 26 is used to enter up to five separate key words briefly defining the contents of the file 7. The regarding button 27 allows the user to enter a full explanation about the contents of the file 7. The regarding button 27 gives the user the option of explaining in detail the contents of the file 7.

Also displayed on the save card 20 are two action buttons 28 and 29. An OK button 28 allows the user to complete the save operation. When the user activates the OK button 28, the save module 12 will store the information from the save card 20 in the File Base 14, give instructions so that the operating system 8 will store the file 7 in memory, place the file 7 (or a reference to the file) in the real world hierarchical file structure 9, and remove the save card 20 from the screen. Control is then returned to the application program. On the other hand, if the user selects the cancel button 29, the save procedure is aborted, the save card 20 is removed from the screen, and control is returned to the application program.

Referring now to FIG. 3, there is illustrated the save card 30 when it is filled with information about a file 7. The save card 30 can be filled in two situations. Firstly, if the user desires to save a file 7 that has previously been saved and information about that file 7 exists in the File Base 14. The information from the File Base 14 can thus be displayed on the save card 30. Alternatively, the save card 30 will be filled after the user has entered information about the file to be saved 7 on the empty file card illustrated in FIG. 2.

A filled file card 30 contains information about the file 7 in place of the headings on the buttons 21 to 27. This example shows that John Doe 31 is the user who created the file 7. The document is located in a green folder called Financial Statement which is contained in a file cabinet called Trump Plaza 32. The file 7 is addressed to Donald Trump 33. The type of document in the file 7 is a spread sheet B4. The format of the file is a microsoft excel.XLS document 35. The key words for the file 7 are "Financial Statement" 36. The comments the user has entered regarding file 7 are "Financial Statements for Trump Plaza Period of January to March 1991" 37.

Figure 3A:
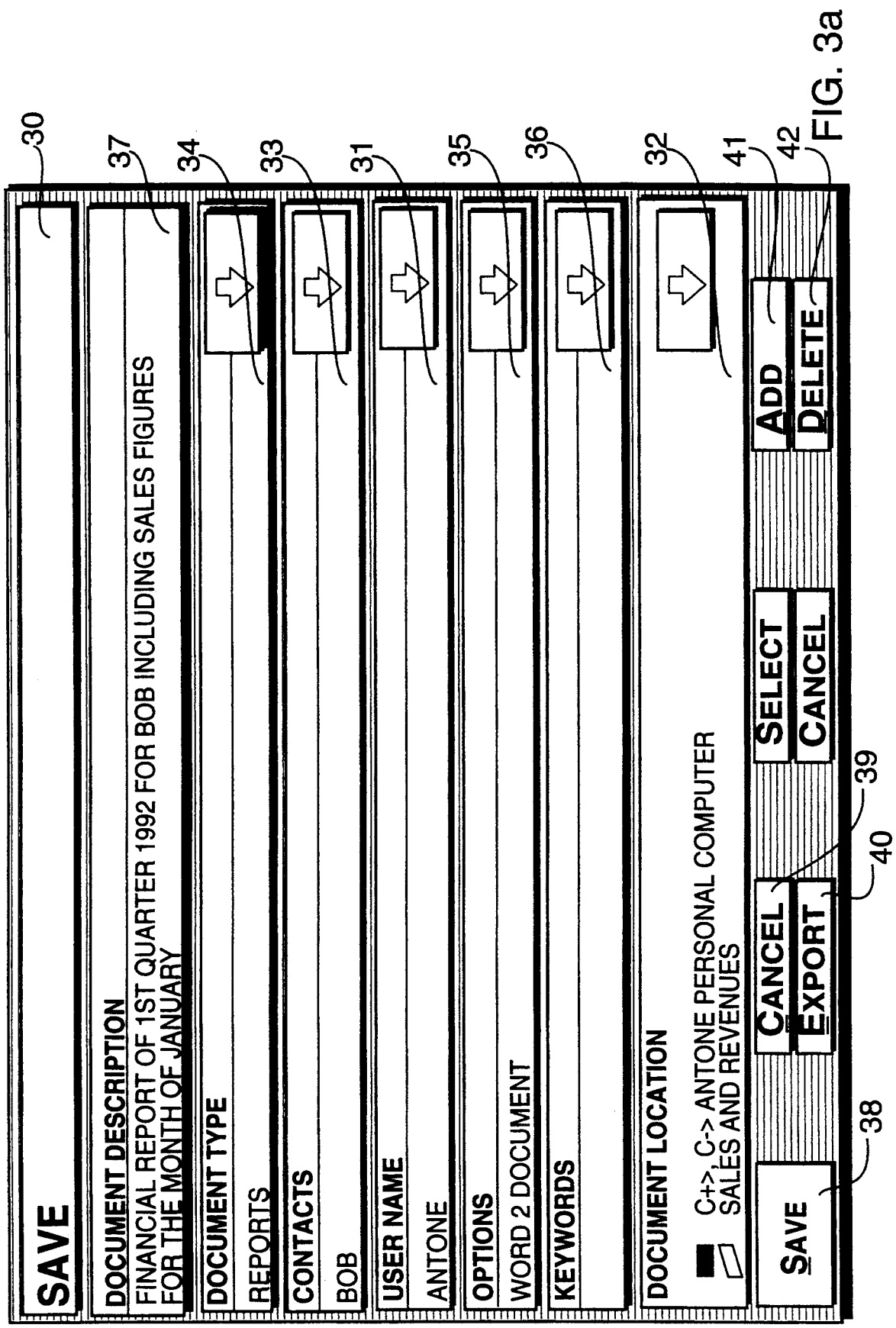
FIG. 3a is a second example of a completed save card.

Referring now to FIG. 3a, there is illustrated a second example of the save card 30 when it is filled with information about a file 7. The fields 31 to 37 are numbered so as to correspond with the fields with the same functions in FIG. 3. In this embodiment, the name of the button is not obscured when the information is entered onto the button. The user id button 21 is labelled "User Name" 31. The Regarding button 27 is labelled, "Document Description" 37. The OK button 28 is labelled "Save" 38. There is also shown an Export button 40, used to save a file 7 to an external storage medium, an Add button 41 and a Delete button 42, to add or delete information from a list box (not shown) for a button.

Figure 4:
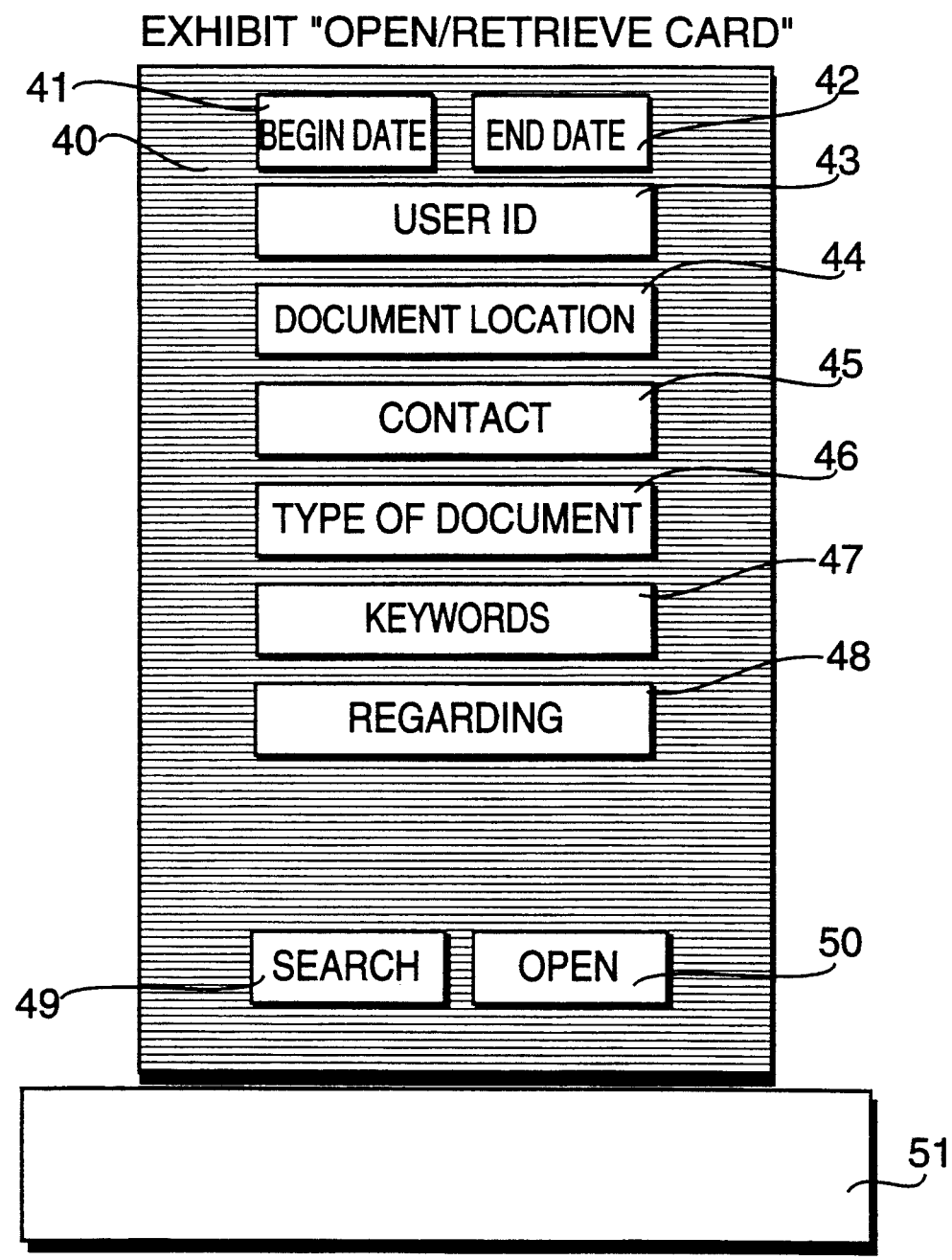
FIG. 4 is an example of the open card displayed by the open module of FIG. 1.

Referring now to FIG. 4, there is illustrated an example of the open card 40 which is displayed by the open module 13 of FIG. 1. The open card 40 shows the various buttons 41 to 48 that could be displayed when the user wishes to retrieve a file 7 from memory. The buttons 41 to 48 are examples of the type of information that could be used to identify and retrieve a file 7. The information the user enters onto the buttons 41 to 48 of the open card 40 is used to search the File Base 14 for relevant files 7.

As examples of the type of buttons that could be displayed, there is illustrated a begin-date button 41, and end date button 42, a user ID button 43, a document location button 44, a contact button 45, a type-of-document button 46, a key words button 47 and a regarding button 48. The user can enter the information requested by each button 41 to 48 on the relevant button to search for a file 7. Any combination of button or button call be used. Of course, the more information that is supplied, the more exact is the search of the File Base 14.

The begin-date button 41 and the end-date button 42 allow the user to enter a begin date and an end date for a file 7 so that all files 7 created between the begin date entered on the begin-date button 41 and the end date entered on the end-date button 42 can be retrieved from the File Base 14. If only the begin date is ended on the begin-date button 41 and the end-date button 42 is left blank, all documents created after the begin date are retrieved. Alternatively, if only the end date is ended on the end-date button 42 and the begin-date button 41 is left blank, all documents created before the begin date are retrieved.

The document location button 43 is used to search the real world hierarchical file structure 9 for the location in the structure in which the file 7 to be retrieved has been placed. By activating the document location button 44, the Document Location Box as illustrated below in FIG. 6, allows the user to choose the actual position in the real world hierarchical file structure 9 where the file 7 is to be retrieved from.

The contact button 45 is used so that the user can select any document sent to another party, and only that party. The names of known contacts are stored in the cont base 16. The type-of-document button 46 allows the user to search for physical types of documents that the file 7 that the user wishes to retrieve contains. A list of known documents types in the system is stored in the type base 17. The key words button 47 allows the user to search for a document based on a word or words that has been stored in the key word field of the file base 14. The regarding button 48 allows the user to search on a word or a string of words that has been previously entered to the regarding field of the File Base 14.

There are also two action buttons 49 and 50 on the open card 40. A search button 49 is used to activate a search of the File Base 14 for files 7 that fulfill the search requirements entered onto the buttons 41 to 48 of the open card 40. Each file 7 that fulfills the search criteria is displayed in a documents found box 51. When the user has selected the requisite file 7 from the documents found box 51 the user activates the open button 50. That file 7 is then opened by the operating system 8, and if necessary, that file's application program is also opened. Control is passed to the application program and the open card 40 is hidden from view.

Figure 5:
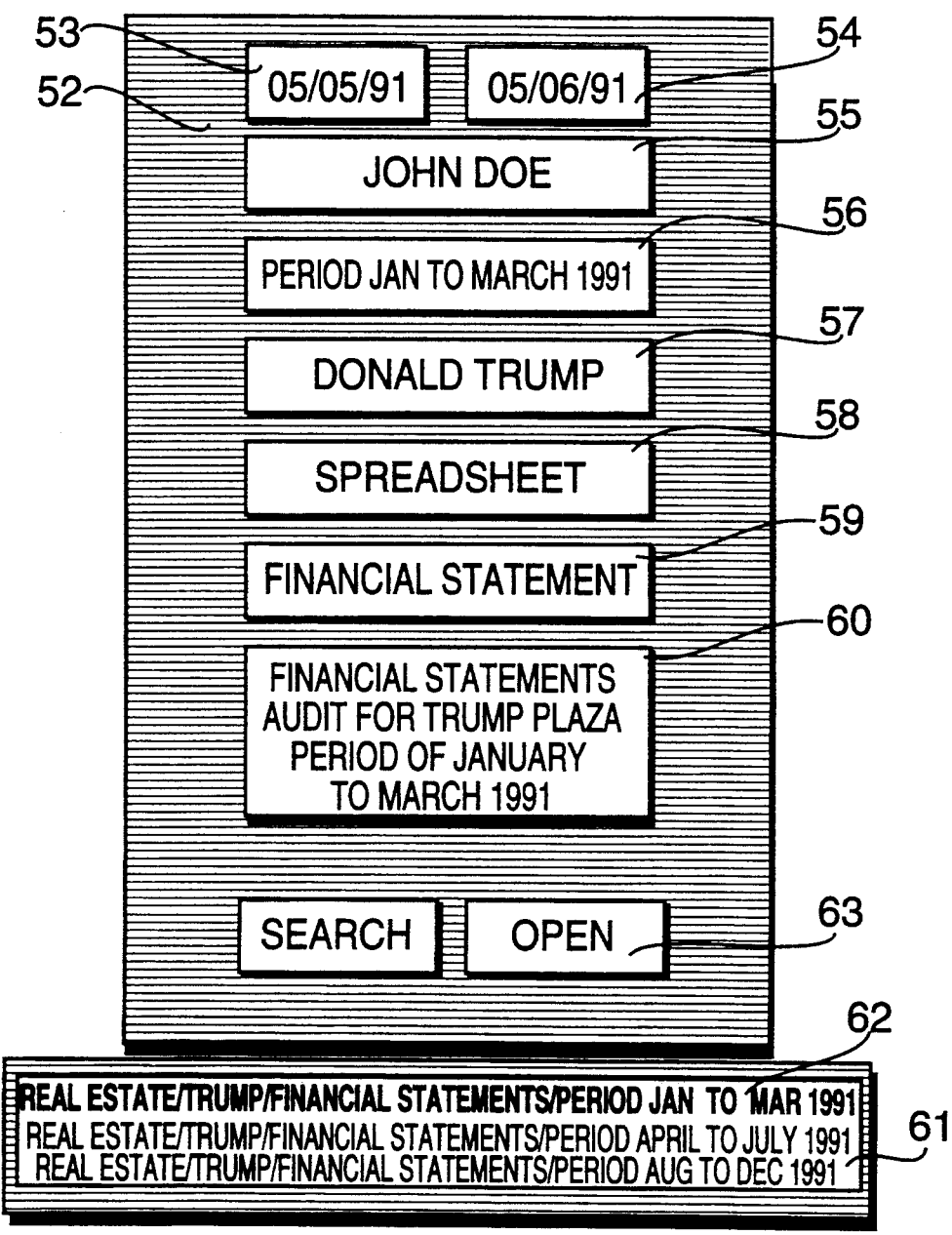
FIG. 5 is an example of a completed open card.

Referring now to FIG. 5, there is illustrated the open card 52 after three files have been retrieved from the Pile Base 14. Each file 7 fulfills the search criteria that had been entered by the user onto the open card 40 of FIG. 4. It can be seen from the documents found box 61 that there are three relevant documents that fulfill the search criteria selected by the user. The first of the these documents 62 has been highlighted by the user. All the relevant information about this highlighted document 62 is thus displayed on the open card 52 so that the user can determine if this is the file the user wishes to open or retrieve. The user can see from the open card 52 that the document was created on May 5, 1991 53 and last modified on May 6, 1991 54. The creator of the document was John Doe 55. The document has been titled by the user in the real world hierarchical file structure as "Period January to March, 1991" 56. The document's contact is Donald Trump 57. The type of document is a spreadsheet 58. The key words concerning the document are "Financial Statement" 59. Comments about the file are shown the regarding box 60.

If the user wishes to open the highlighted file 62 in the document found box 61, the user may activate the open button 63 on the open card 52.

Figure 5A:
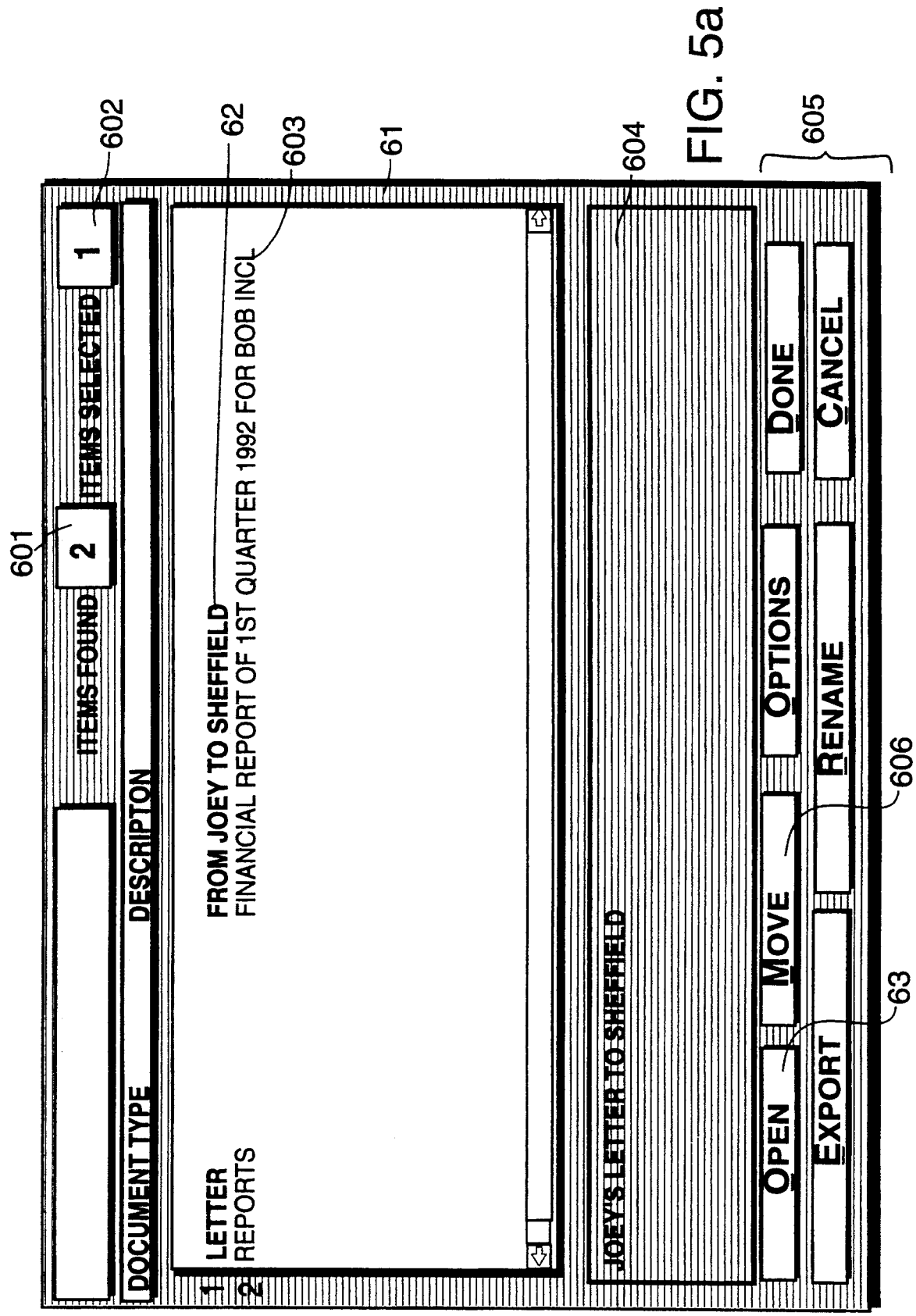
FIG. 5a is an example of an alternative embodiment of the document found box, which is part of the open card of FIG. 5.

Referring now to FIG. 5a, there is illustrated a second example of the document found box 61. In this example, the document found box 61 is not part of the open card 52, but is a separate window. In addition, this example displays the number 601 of items found by the search, the number 602 of items selected by the user 62, information 603 about the documents found from the Pile Base 14, information 604 about the document(s) selected by the user 62, as well as action buttons 605, such as the open button 63 and a move button 606 (to move the document to another location in the real world hierarchical file structure.

Referring now to FIGS. 6a to 6e, there is illustrated an example of the representative embodiment of the Document Location Box 70 which is displayed whenever the user selects the document location button 22 on the save card 20 of FIG. 2 or the document location button 44 on the open card 40 of FIG. 4. FIGS. 6a to 6e show the different displays in the Document Location Box 70 as the user traverses the real world hierarchical file structure 9.

The Document Location Box 70 is divided into two windows 71 and 72 called the select window 71 and the path window 72. The select window 71 displays a series of icons, in this example 76 to 78, that represent the choices the user may make to move to the next level in the real world hierarchical file structure 9. The path window 72 displays the path the user has traversed through the real world hierarchical file structure 9 to reach the current level. The items of the current level are represented by the graphical icons 76 to 78 displayed in the select window 71.

Also available in the Document Location Box 70 are three action buttons, an OK button 73, an open button 74 and a cancel button 75. Further, there are four buttons to manipulate the real world hierarchical file structure 9, an add button 79, a move button 80, a delete button 81 and a rename button 82. The OK button 73 allows the user to signal to the document locator module 20 that the user has finished using the Document Location Box 70. The open button 74 allows the user to open the file that the user has selected from the select window 71. The cancel button 75 is to enable the user to turn to the open card 40 or the save card 20 without affecting the status of the information on those cards.

The add button 79 allows the user to add levels or files to the real world hierarchical file structure 9. The move button 80 allows the user to move levels or files to different locations in the real world hierarchical file structure 9. The delete button 81 allows the user to delete files or levels (and therefore all levels and files which are lower in the real world hierarchical file structure 9 than that level) from the real world hierarchical file structure 9. The rename button 82 allows the user to rename levels or files.

Figure 6A:
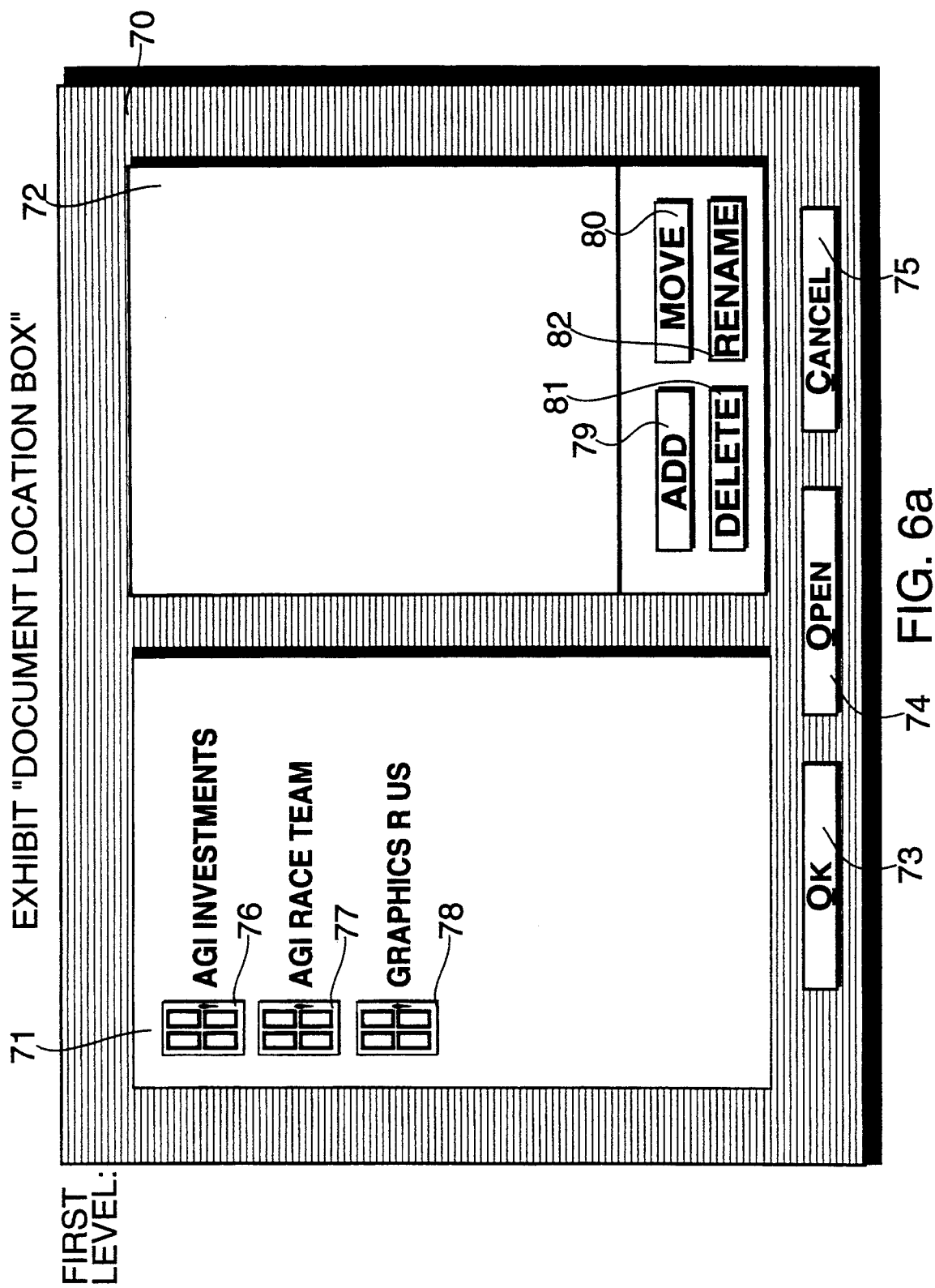

FIGS. 6a–6e show the state of the Document Location Box 70 as the user traverses the real world hierarchical file structure 9. The first screen displayed to the user when user enters the Document Location Box 70 (i.e., when the user activates the document location button 44 on the open card 40 of FIG. 4) is shown in FIG. 6a. The path window 72 is blank as the user has not yet selected a path. The select window 71 shows three door icons 76–78 which are each labeled with names to identify their contents. The door icons 76–78 are graphical representations of data storage devices. The door icon 76–78 represent the first defined level in the real world hierarchical file structure 9. The user, to traverse the real world hierarchical file structure 9, must select one or more of the door icons 76–78.

Figure 6B:
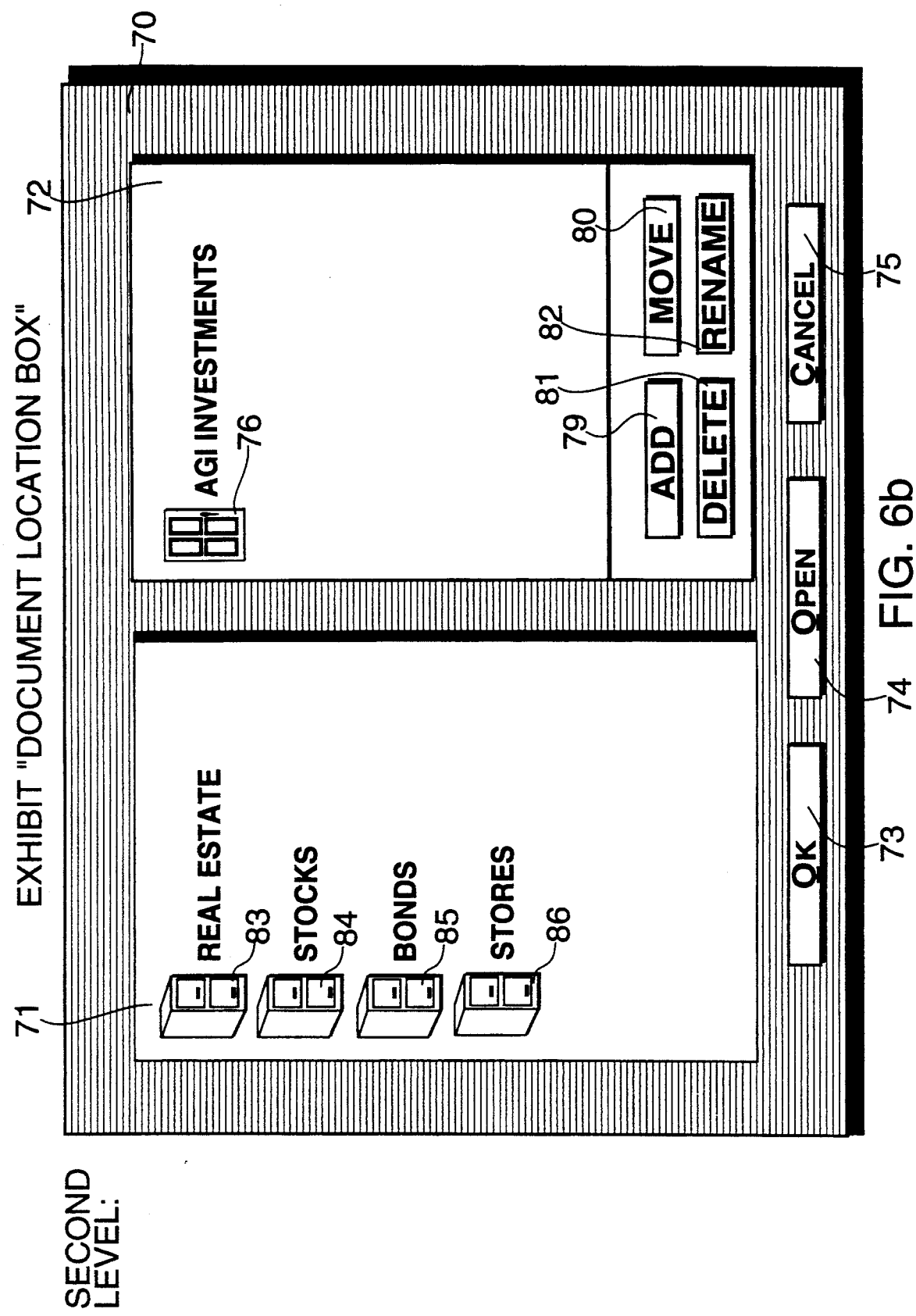

Assuming that the user selects the "AGI Investments" icon 76 then the state of the Document Location Box 70 will be that shown in FIG. 6b. The door icon 76 that was selected by the user now appears in the path window 72. The door icon 72 is shown in the path window as an open door. Each of the sublevels of the item represented by the selected door icon 76 (shown in the path window 72) are displayed in the select window 71. In this example, there are four levels in the real world hierarchical file structure 9 that are sublevels of the "AGI Investments" level 76. The four levels are represented in the select window 71 by four filing cabinet icons 83–86 each with their respective names, signed by the user, along side. To move to the next level in the real world hierarchical file structure 9, the user may select one of the four filing cabinet icons 83–86.

Figure 6C:
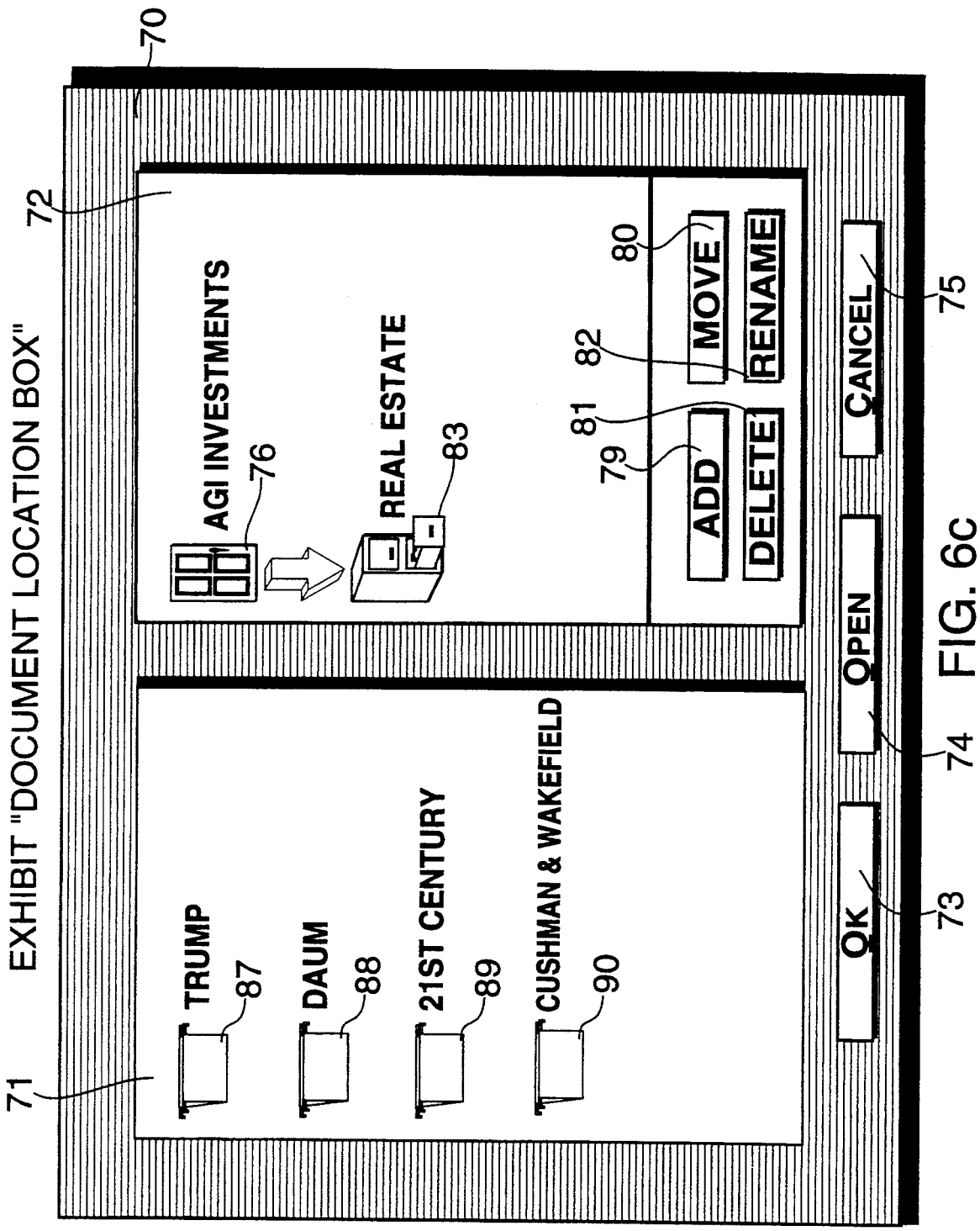

Assuming that the user selects the "Real Estate" file cabinet icon 63 from the select window 71, then the Document Location Box 70 will be that displayed in FIG. 6c. The "Real Estate" file cabinet icon 83 is now displayed in the path window 72 with its filing cabinet draw opened. The next level of the real world hierarchical file structure 9 is displayed in the select window 71. The select window 71 shows four green folder icons 87–90. To move to the next level in the real world hierarchical file structure 9, the user may select one of the four green folder icons 87–90.

Assuming that the user selects the "Trump" green folder icon 87, then the state of the Document Location Box 70 will be that shown in FIG. 6d. The selected green folder icon 76 has been moved to the path window 72. The next level in the real world hierarchical file structure 9 is displayed in the select window 71. That level consists of five manila folder icons 91–95 and one document 96. The document 96 represents a file that the user may open using the open button 74. The manila folder icons 91–95 represent further levels in the real world hierarchical file structure 9. Assuming that the user selects the "financial statements" manila folder 92, then the state of the Document Location Box 70 will be that shown in FIG. 6e. The "financial statements" manila folder icon 92 has been moved to the path window 72. The path window 72 shows the path the user has traversed through the real world hierarchical file a structure 9 to reach the present state of the select window 71. If the user has entered the Document Location Box 70 from the open card 40, the select window 71 shows six document icons 97–102, each representing a file 7 that the user may open. Alternatively, if the user has entered the Document Location Box 70 from the save card 20, then the user may select the "financial statements" icon 92 as the level at which the user wishes to store the file 7 to be saved. That file 7 will be represented by a new document icon in the select window 71. The user will be allowed to name the document icon and will not be limited to the naming convention of the underlying operating systems 8.

From the Document Location Box 70 displayed in FIG. 6e, the user may select an icon 76 or 83 or 87 or 92 from the path window 72 and return to that higher level in the real world hierarchical file structure 9. If the user does so, then the select window 71 will be updated to display the sublevels of that selected icon.

Figure 6F:
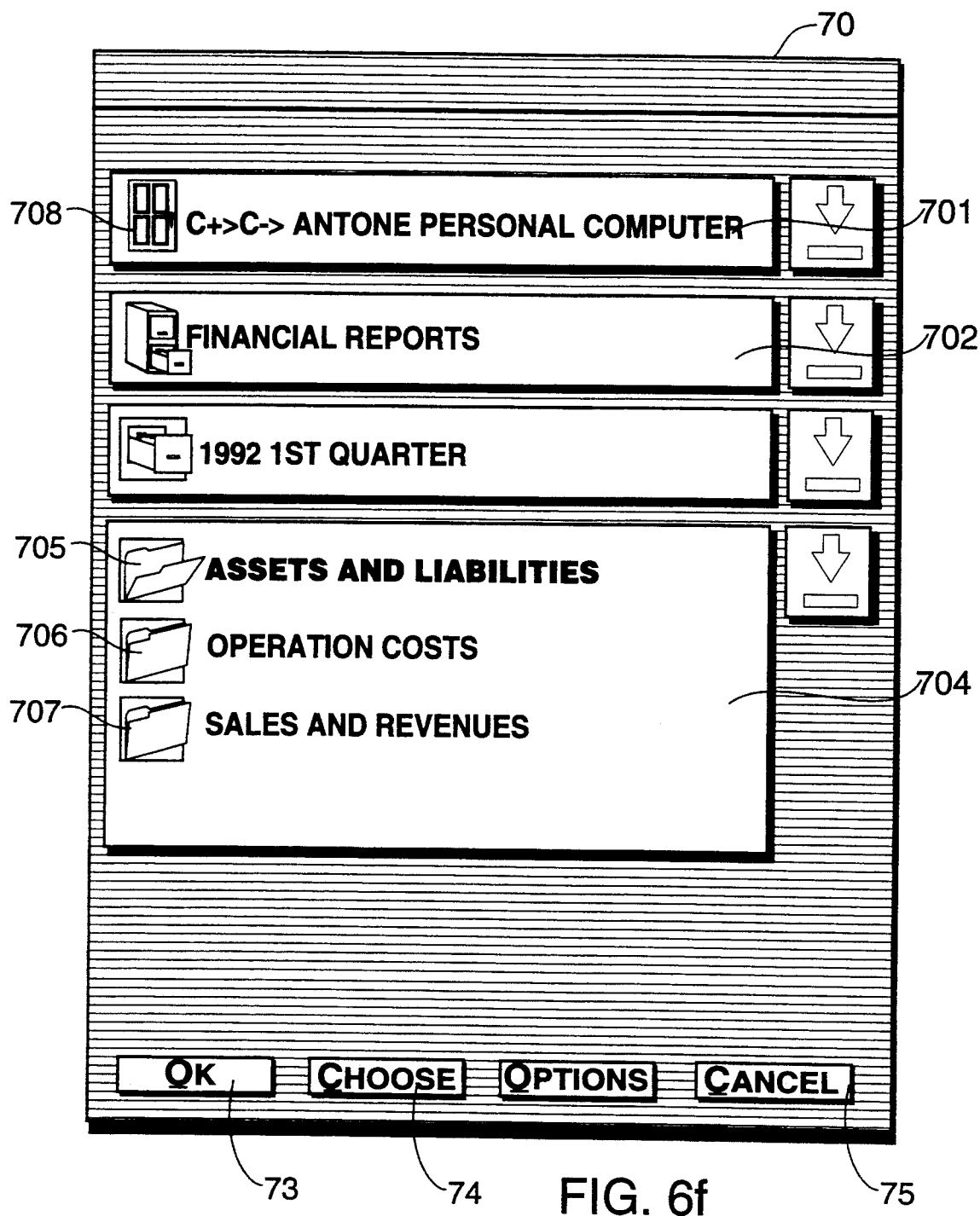
FIG. 6f is an example of an alternative embodiment of the document location box generated by the Document Locator Module of FIG. 1.

Referring now to FIG. 6f, there is illustrated another example of the Document Location Box 70. In this exampled the Document Location Box 70 is not divided into two sections. In this example, there is a window display for the door selected 701, for the filing cabinet selected 702, for the draw selected 703, and a window 704 displaying the green folders 705–707 that may be selected to move to the next level in the real world hierarchical file structure. The "active" green folder 705 is highlighted. If this is selected, then a further window (not shown) will be displayed showing the documents "stored" in the selected green folder 705.

Alternatively, if the window display for the file cabinet 702 is selected, the draw window 703 and the green folder window 704 will disappear and the filing cabinet window 702 will be shown, displaying all file cabinets for the door 708 displayed in the door window 701.

Figure 7:
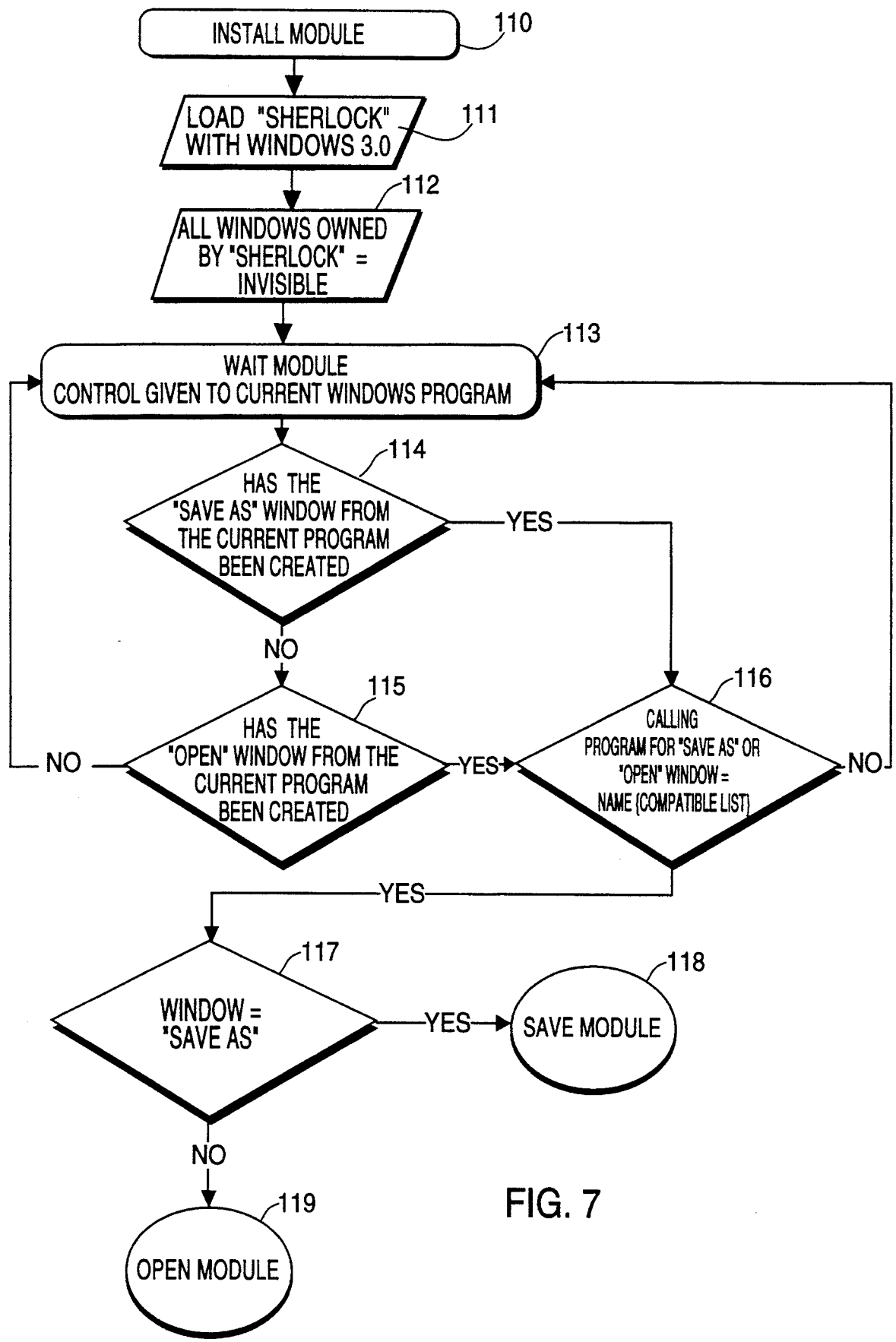
FIG. 7 is a flow chart illustrating the initial operation of the user interface system of the present invention.

Referring now to FIG. 7, there is illustrated in flow chart form the flow of control of the representative embodiment of the present invention when it is operated in conjunction with the MS-DOS operating system and the Windows 3.0 program. The user must load the present invention into a computer's memory device. The install module 110 is activated. First, the program, in this example called "Sherlock" is loaded along with the Windows 3.0 program 111. All windows and cards that are required for use by the present invention are opened but are not displayed 112. The wait module 11 is then activated and control is passed to the Windows 3.0 program 113. Any time that the Windows 3.0 program is in operation, the wait module 11 causes the system of the present invention to remain inactive until it is triggered by the user selecting a nominated command. If the user selects a "save" or "save as" command or if the user indirectly triggers a save command 114 then the name of the calling program is stored in a compatible list 116 and the save module 118 is opened. If the user has selected an open command 115 then the name of the calling program is stored in the compatible list 116 and it is therefore determined 117 to activate the open module 119.

Figure 8:
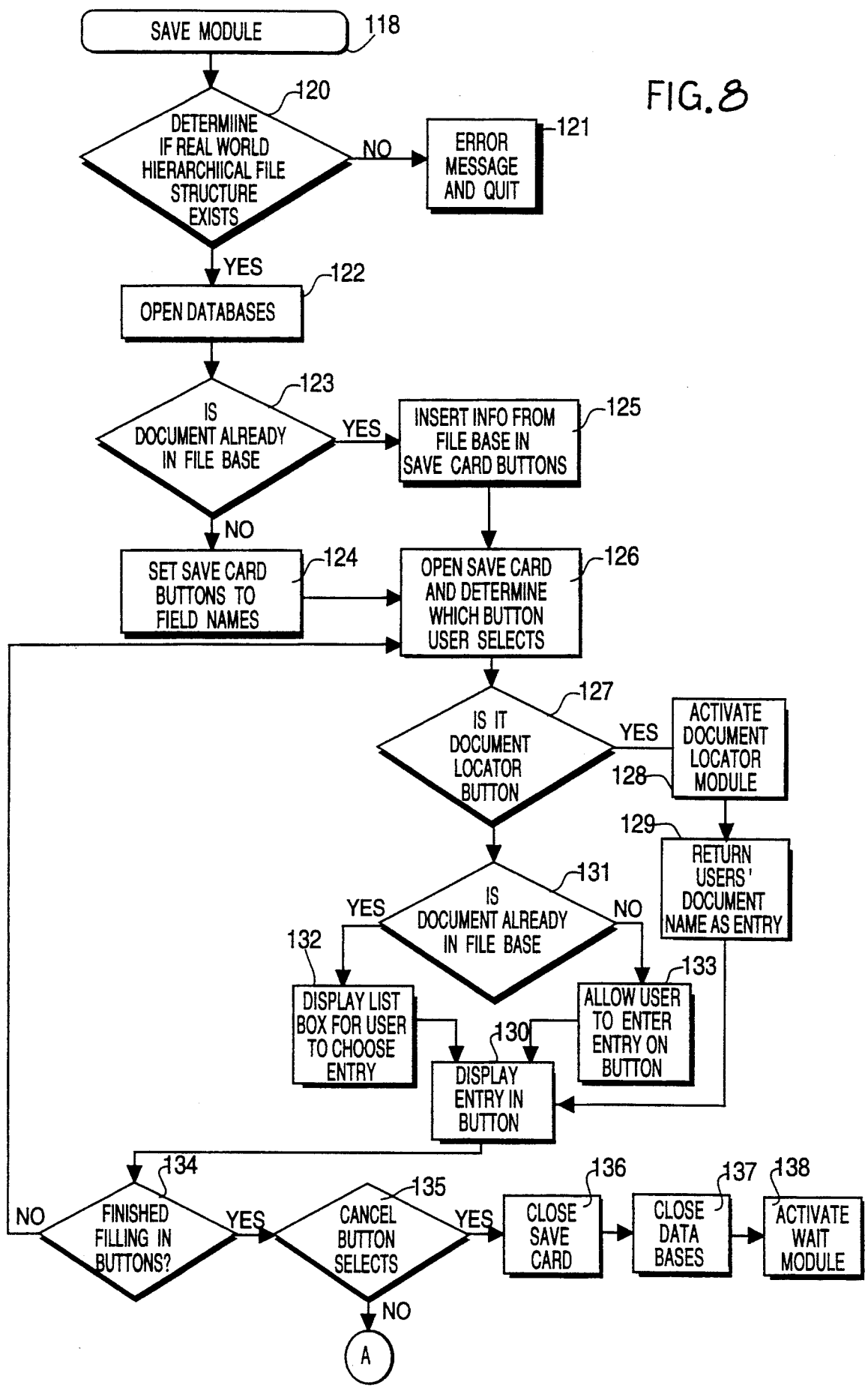
FIG. 8 is a flow chart illustrating the operation of the save module of FIG. 1.

Referring now to FIG. 8 there is illustrated in flow chart form the operation of the save module 118. First it is determined if there has been previously created a real world hierarchical file structure 120. If no real world hierarchical file structure 9 exists, then an error message is printed and the operation of the present invention ceases 121. If the real world hierarchical file structure 9 does exist, then the data bases that are needed to operate the save module are opened 120. These include the File Base 14, the synm base 15, the cont base 16, the type base 17 and the optn base 18 of FIG. 1. It is determined if the document to be saved already has information stored about it in the file base 123. If there is information stored about the document to be saved in the File Base 14, then the save card is displayed with the buttons both displaying the field names for each button 124 (as shown in FIG. 2). If there is information concerning the document in the File Base 14, then that information is displayed in the relevant buttons on the save card 125 (as shown in FIG. 3). The user may select a button from the save card. It is determined which button the user selects 126. If the user selects the document locator button 127 then the document locator module 20 is activated 128. The document locator module displays on the screen the Document Location Box as explained in FIGS. 6a–6e.

After the user has exited the Document Locator Box, the name the user has given to the document is returned as an entry 129, displayed on the document location button 130. If the document locator button was not selected 127, then it is determined whether the button which was selected has associated with it a list box 131.

If there is an associated list box, then the entries from the relevant database 15 to 18 are displayed so that the user can choose the relevant entry 132. If there is no associated list box, then the user is allowed to enter the desired information on the button on the save card 133. The desired information is displayed on the relevant button on the save card 130. If the user has not finished filling the buttons on the save card 134, then the user can enter further information on the save card 126. If the user has finished in filling in the buttons on the save card 134 but the cancel button is selected 135, then the save card is closed 136 all the databases that were opened in step 122 are closed 137 and the wait module 11 is activated 138. However if the cancel button is not selected, it is next determined if the document is to be saved on a fixed disc drive 139. If so, then the document is assigned a MS-DOS operating system file name 140, the file base is updated 141, the document is saved in the file under the assigned file name 142, the save card is closed, the opened databases are closed 143 and the wait module 11 is activated 144. However, if the document is to be saved on a temporary storage device, such as a floppy disk, then the user is asked for a MS-DOS operating system file name 145 and the document is saved as a file on the floppy disk 146. As well, the information from the save card is copied onto the companion file on the floppy disc ending in the suffix ".DEF" 147. A copy of the files "WHATIS.EXE" and "WHEREIS.EXE" are copied to the floppy disk 48, the save card and all data bases are closed 149 and the wait module 11 is activated 150.

Figure 9:
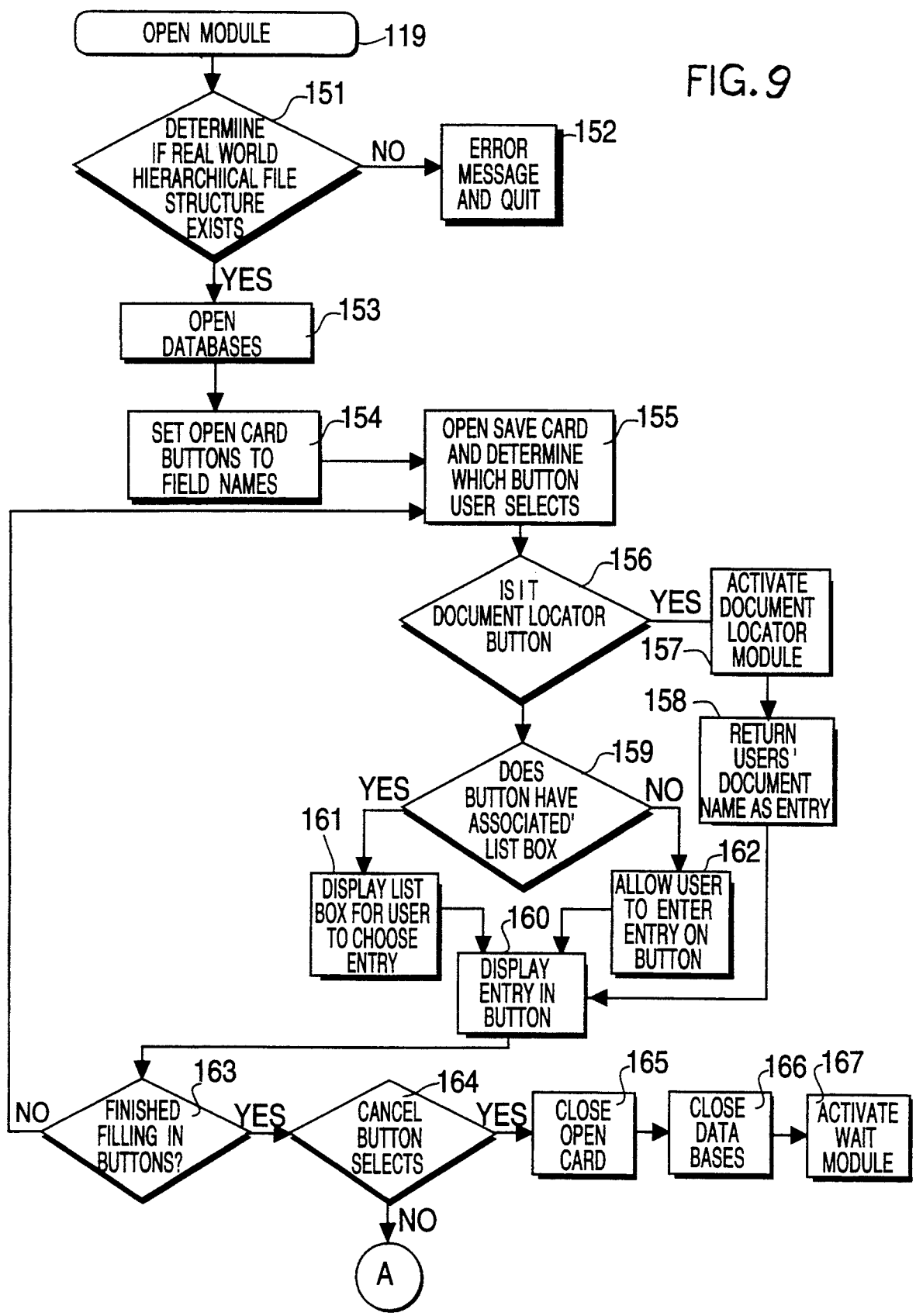
FIG. 9 is a flow chart illustrating the operation of the open module of FIG. 1.
Figure 9:
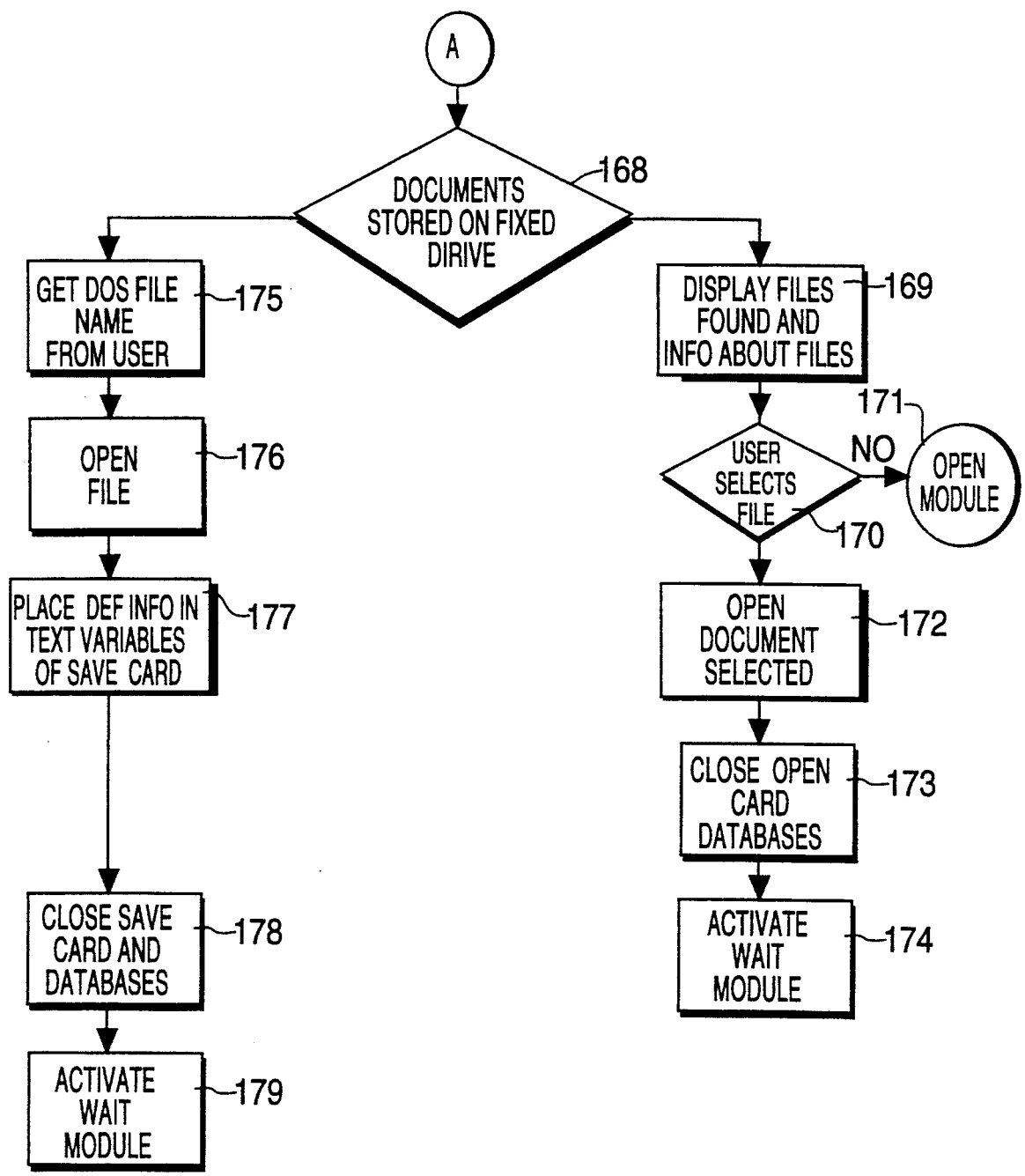

Referring now to FIG. 9, there is illustrated in flow chart form the operation of the open module 119. It is determined if the real world hierarchical file structure 7 has previously been created 151. If it does not exist, then an error message is printed and the operations cease 152. If the real world hierarchical file structure 7 exists, then all relevant databases are opened 153. The open card buttons are set to the relevant field names 154 (as shown in FIG. 4). The user can select a button from the open card 155.

The procedure then follows the procedure for the save module 127 to 138 until the user is satisfied with the choices entered on the open card 156 to 167. When the user has decided that the user has finished filling in the buttons on the open card 163, and has not canceled the open operation 164, then the open module determines if the document is to be stored on a fixed drive 168. If the document is to be stored on a fixed drive, then the documents found window 51 of FIG. will be filled to contain the list of files from the Pile Base le that match with the search criteria that the user has entered onto the save card. If the user selects a file 7 from the documents found window 170, then the open card is removed from the screen, the databases that are opened are closed 173 and the wait module 11 is activated 174. If the user does not select a file from the documents found window 61, then the operation recommences from the beginning of the open module 171 and 119. If the file 7 is not to be stored on a fixed drive, then the MS-DOS operating system file name is requested from the user 175. That file is opened 176. The open module 13 will search the disk on which the file 7 is located to see if a companion ".DEP" file 7 related to the file that was opened is stored on the disk. If so, then the information in that companion ".DEP" file is placed in the text variables for the save card for use in the save operation 177. The save card is removed from the screen and all open data bases are closed 178. The wait module 11 is then activated 179.

Figure 10A:
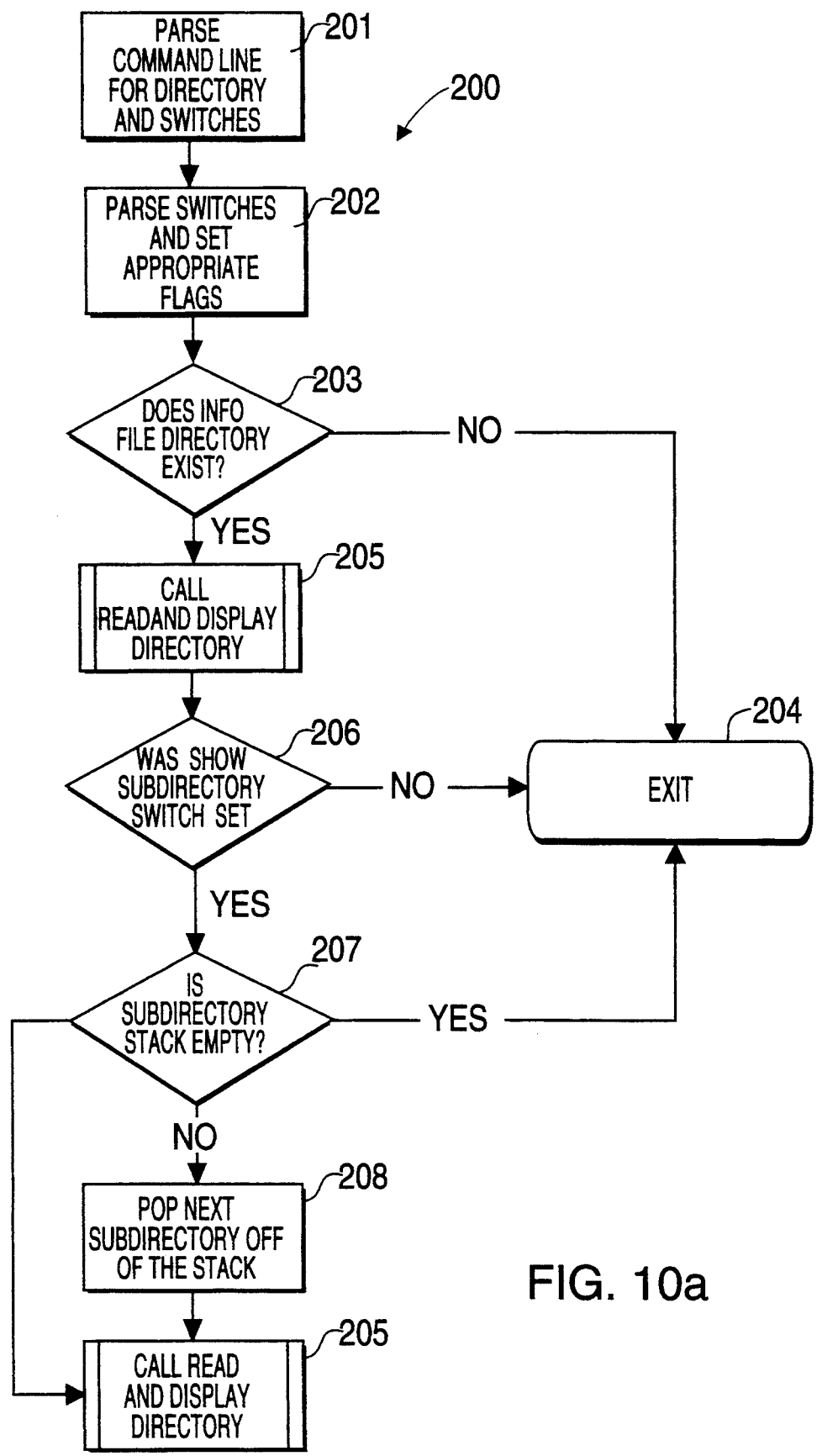
FIGS. 10a to 10c are flow charts illustrating the operation of the WHATIS.exe command of FIG. 1.

Referring now to FIG. 10a there is illustrated in flow chart form the operation of the "WHATIS.exe" command that is copied with each file that is not saved on a fixed drive (see FIG. 8, step 148). The WHATIS command is like an external MS-DOS operating system command used to give information about a file that has been exported from storage device containing the real world hierarchical file structure 7.

When the WHATIS command is activated by the user. For example, when the user types if "WHATIS filename", the WHATIS process is activated 200. The part "filename" is the parameter, entered on the command line by the user.

First, the command line parameters and the switches of the WHATIS command entered by the user are passed 201 and the appropriate flags and switches are set 202, just as if the DIR command was the chosen command. If no information about the file(s) selected by the user exists 203, the operating system does nothing 204. Alternatively, the readAndDisplayDirectory module 205 is called, (See FIG. 10b), which displays information about the files selected. If the subdirectory switch was not set 206 or if the subdirectory stack was empty 207, the command's function is complete 204. If not, for example where more than one subdirectory fulfills the user's command line parameter, the next subdirectory is "popped" off a subdirectory stack (step 208). Information about that subdirectory is then displayed 205 and control returns to step 207.

Figure 10B:
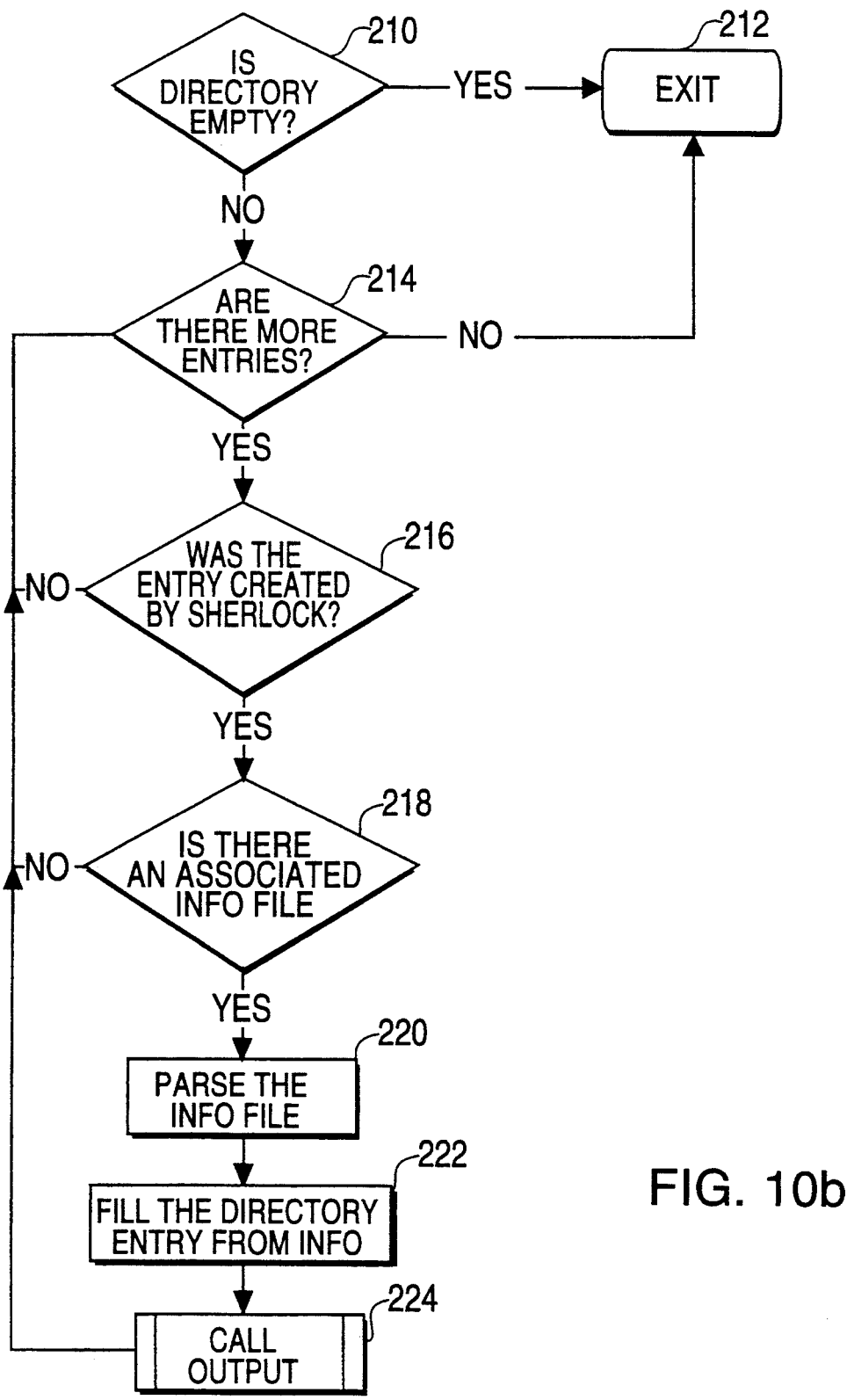

Referring now to FIG. 10b, there is illustrated the readAndDisplayDirectory module flow chart called from step 205 of FIG. 10a. The module is to display the selected files in an operating system directory, as well as the related information from the File Base 14 that was stored in each file's "DEF" file. The flow chart is self explanatory. In step 216, the file is examined to see if there was a related ".DEF" file created by the save module 12. If sod and there is an associated ".DEF" file containing information about the file stored, a Directory Entry for that file is filled in 222, and the output module is called 224.

Figure 10C:
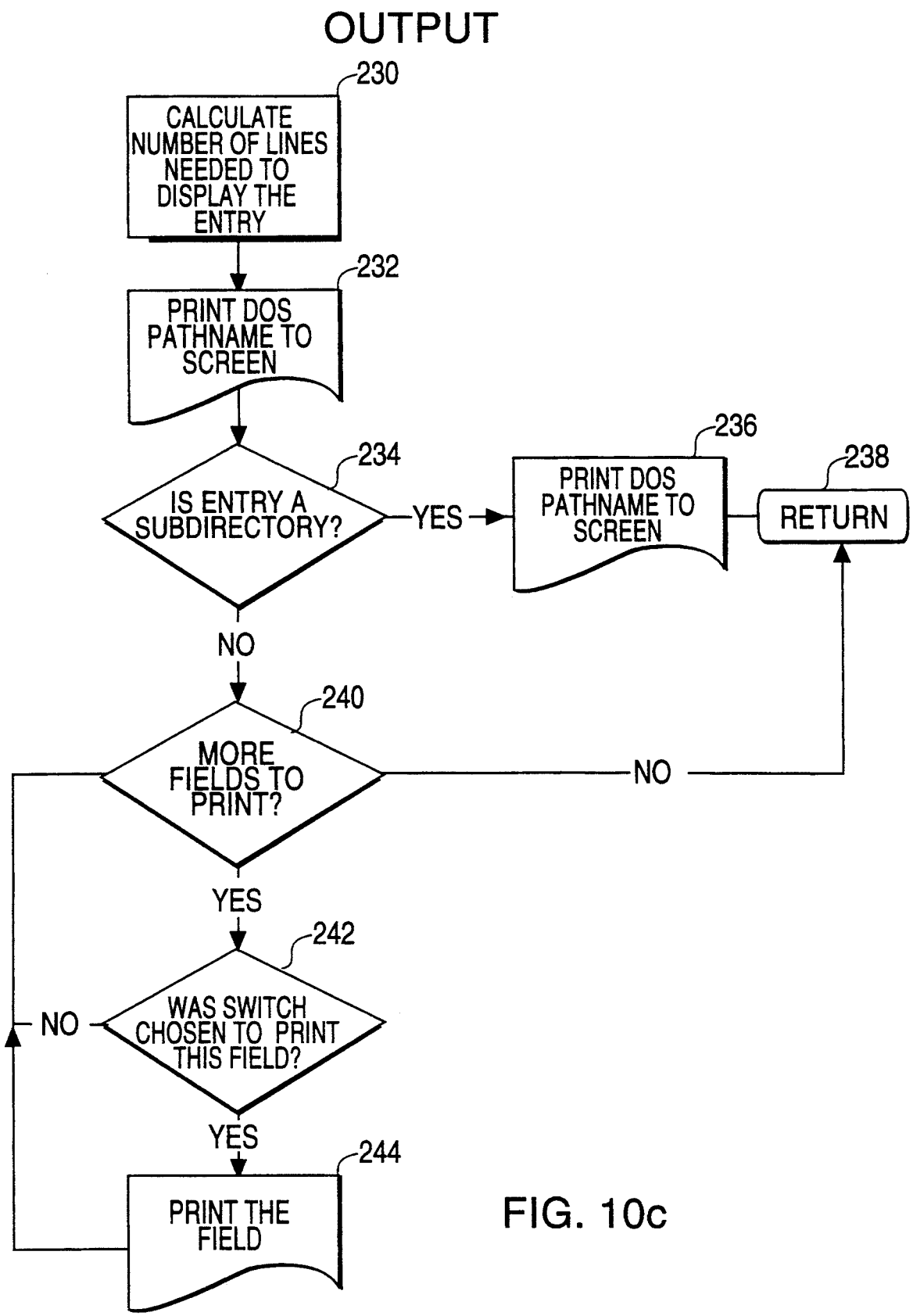

Referring now to FIG. 10c, there is illustrated the Output module flow chart called from step 224 of FIG. 10b. The output module outputs the DOS pathname of selected files (step 232) and all the information in the ".DEF" file associated with each file to be output (step 244). The flow chart is self explanatory.

Figure 10D:
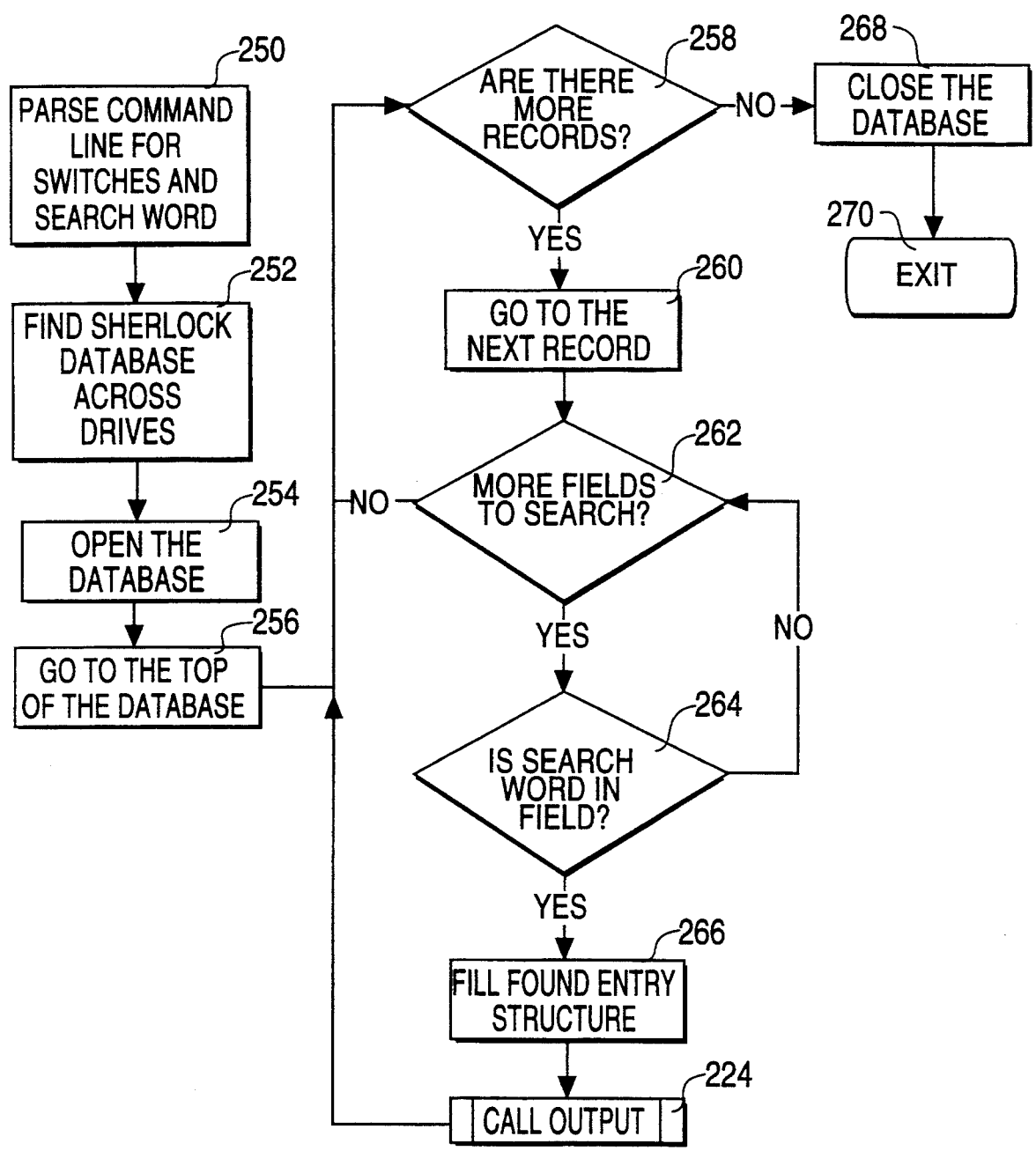
FIG. 10d is a flow chart illustrating the operation of the WHEREIS.exe command of FIG. 1.

Referring now to FIG. 10d, there is illustrated in flow chart form the operation of the WHEREIS.EXEC command. It is copied with each file not saved on a fixed disk drive (see FIG. 8, step 148.) The command line that the user enters is parsed for switches and the search word parameter 250, as is usual for DOS commands. In this embodiment, the File Base 14 is located (e.g. where it is stored on a network) 252 it is opened 254 and entered 256. All records that match the search criteria of the command line parameter entered by the user are found (258 to 264) by searching the contents of the database. The desired information is placed in a foundEntry structure 266 and the output module 224 of FIG. 10c is called.

In an alternative embodiment, instead of accessing the File Base, the desired ".DEF" files can be accessed, as is done for the "WHATIS" command explained in FIGS. 10a to 10c above.

Referring now to FIG. 11 there is listed the structure the File Base 14 of FIG. 1. The File Base consists of fields, in this example twenty-three fields 220. For each field, there is listed whether the field contains characters or a date. If a field contains a characters a "C" is displayed next to the field name 220 in the Character or Date column 221. If the field 220 contains a date then a "D" is listed in the Character or Date column 221 next to the field name 220. A length column 222 lists the number of characters that can be stored each field 220. A description column 223 lists a description of each field 220.

What is claimed is:

1. A file directory and retrieval system for use in a computer, the computer comprising an output device, a memory and a processor operating according to an operating system program and an application program, the memory of the computer storing files in a directory structure, the directory structure organized according to conventions of the operating system, the file directory and retrieval system comprising:
   a map mapping the directory structure of the files stored in the memory to a real world hierarchical file structure of files and directories independent of conventions of the operating system;
   means for creating, moving and deleting directories without exiting the application program;
   means, operating in the background of the application program and intercepting control of the processor when a command is executed to cause a file to be opened, for displaying on the output device an open card to allow entry of information relating to the contents of the file and location of the file in the real world hierarchical file structure, utilizing the map for mapping the location of the file in the real world hierarchical file structure to the directory structure, and for causing the operating system to open the file; and
   means, operating in the background of the application program and intercepting control of the processor when a command is executed to cause the application program to request information about a file to be saved, for displaying on the output device a save card to allow entry of information relating to the contents of the file to be saved and a location for the file in the real world hierarchical file structure, utilizing the map for mapping the location for the file in the real world hierarchical file structure to the directory structure, and causing the operating system to save the file in the directory structure.

2. The file directory and retrieval system of claim 1 further comprising means for controllably displaying a graphical representation on the output device of the real world hierarchical file structure.

3. A file directory and retrieval system for use in a computer, the computer comprising an output device, a memory and a processor operating according to an operating system program and an application program, the memory of the computer storing files in a directory structure, the directory structure organized according to conventions of the operating system, the file directory and retrieval system comprising:
   a map mapping the directory structure of the files stored in the memory to a real world hierarchical file structure of files and directories independent of conventions of the operating system;
   means for creating, moving and deleting directories without exiting the application program; and
   means, operating in the background of the application program and intercepting control of the processor when a command is executed to cause a file to be opened, for displaying on the output device an open card to allow entry of information relating to the contents of the file and location of the file in the real world hierarchical file structure, utilizing the map for mapping the location of the file in the real world hierarchical file structure to the directory structure, and causing the file to be opened.

4. The file directory and retrieval system of claim 3 further comprising means for controllably displaying a graphical representation on the output device of the real world hierarchical file structure.

5. A file directory system for use in a computer, the computer comprising an output device, a memory and a processor operating according to an operating system program and an application program, the memory of the computer storing files in a directory structure, the directory structure organized according to conventions of the operating system, the file directory system comprising:
   a map mapping the directory structure of the files stored in the memory to a real world hierarchical file structure of files and directories independent of conventions of the operating system;
   means for creating, moving and deleting directories without exiting the application program; and
   means, operating in the background of the application program and intercepting control of the processor when a command is executed to cause the application program to request information about a file to be saved, for displaying on the output device a save card to allow entry of information relating to the contents of the file to be saved and a location for the file in the real world hierarchical file structure, utilizing the map for mapping the location for the file in the real world hierarchical file structure to the directory structure, and causing the file to be saved in the directory structure.

6. The file directory system of claim 5 further comprising means for controllably displaying a graphical representation on the output device of the real world hierarchical file structure.

7. A computer-implemented method for accessing information about the contents of a file stored in a first memory device when the file is transferred to a second memory device, the method comprising:
   (a) saving information about the contents of the file in a database stored in the first memory device;
   (b) accessing the database to retrieve the saved information about the contents of the file when the file is to be stored in the second memory device;
   (c) storing the retrieved information in a companion file in the second memory device;
   (d) storing the file in the second memory device; and
   (e) storing an access command in the second memory device that, when executed, displays the contents of the companion file and the name of the file in the second memory device.

8. In a computer system comprising a processor, a memory device and a monitor, the processor operating according to an application program and an operating system, a computer-implemented method for saving a file in the memory device, the method comprising:
   (a) selecting a save command using the application program;
   (b) intercepting control from the application program before the application program displays a save user interface;
   (c) displaying on the monitor a save card;
   (d) accepting information about the file on the save card;
   (e) accepting information about a location at which the file is to be saved in a form independent of the form required by the operating system or the application program;
   (f) storing the accepted information about the file in a database in the memory device;

(g) storing in the database the location at which the file is to be saved in a form required by the operating system; and (h) storing the file in the memory device.

9. In a computer system comprising a processor, a memory device and a monitor, the processor operating according to an application program and an operating system, a computer-implemented method for retrieving a file saved in a location in the memory device, the method comprising:

(a) selecting an open command using the application program;

(b) intercepting control from the application program before the application program displays an open user interface;

(c) displaying on the monitor an open card;

(d) accepting information about the file on the open card;

(e) accepting on the open card information about the location at which the file is saved in a form independent of the form required by the operating system of the application program;

(f) retrieving an operating system location for the file from a database in the memory device using information stored in the database relating to the file; and (g) utilizing the operating system location to retrieve the file from the memory device.

10. In a computer system comprising a processor, a memory device and a monitor, the processor operating according to an application program and an operating system, a computer-implemented method for retrieving a file from the memory device, the method comprising:

(a) selecting an open command using the application program;

(b) intercepting control from the application program before the application program displays an open user interface;

(c) displaying on the monitor an open card;

(d) accepting information about the file on the open card independent of operating system conventions;

(e) retrieving an operating system location for the file from a database in the memory device using information stored in the database about the file; and (f) retrieving, utilizing the operating system location, the file from the memory device.

11. In a computer system comprising a processor, a memory device and a monitor, the processor operating according to an application program and an operating system, a computer-implemented method for retrieving a file saved in a location in the memory device, the method comprising:

(a) selecting an open command using the application program;

(b) intercepting control from the application program before the application program displays an open user interface;

(c) displaying on the monitor an open card;

(d) accepting information on the open card about the location at which the file is saved in a form independent of the form required by the operating system or the application program;

(e) retrieving an operating system location for the file from a database in the memory device using information stored in the database relating to the file that is in a form independent of the form required by the operating system of the application program; and (f) retrieving, utilizing the operating system location, the file from the memory device.

12. The file directory and retrieval system of claim 1 further comprising means for moving files without exiting the application program.

13. The file directory and retrieval system of claim 3 further comprising means for moving files without exiting the application program.

14. The file directory system of claim 5 further comprising means for moving files without exiting the application program.

15. A computer-based apparatus for organizing files in and retrieving files from a memory of a computer system, the computer system comprising an output device and a processor operating according to an operating system program and an application program, the memory of the computer system storing the files in a directory structure, the directory structure organized according to conventions of the operating system, the computer-based apparatus comprising:

a map mapping the directory structure of the files stored in the memory to a real world hierarchical file structure of files and directories independent of conventions of the operating system;

means for creating, moving and deleting directories without exiting the application program;

means for deleting and moving files without exiting the application program; and means for displaying on the output device an open card to allow entry of information relating to the contents of the file and location of the file in the real world hierarchical file structure whenever an application program command is executed to cause a file to be opened.

16. A computer-based apparatus for retrieving files from a memory of a computer system, the computer system comprising an output device and a processor operating according to an operating system program and an application program, the memory of the computer system storing the files in a directory structure, the directory structure organized according to conventions of the operating system, the computer-based apparatus comprising:

means for mapping the directory structure of the files stored in the memory to a real world hierarchical file structure of files and directories independent of conventions of the operating system; and means for displaying on the output device an open card to allow entry of information relating to the contents and location of a file in the real world hierarchical file structure whenever an application program command is executed to cause a file to be opened.

17. A computer-based apparatus for organizing and saving files in a memory of a computer system, the computer system comprising an output device and a processor operating according to an operating system program and an application program, the memory of the computer storing files in a directory structure, the directory structure organized according to conventions of the operating system, the computer-based apparatus comprising:

a map mapping the directory structure of the files stored in the memory to a real world hierarchical file structure of files and directories independent of conventions of the operating system;

means for creating, moving and deleting directories without exiting the application program;

means for moving and deleting files without exiting the application program; and means for displaying on the output device a save card to allow entry of information relating to the contents of a file to be saved and a location for the file in the real world hierarchical file structure whenever a command is executed to cause the application program to request information about a file to be saved.

18. A computer-based apparatus for organizing and saving files in a memory of a computer system, the computer system comprising an output device and a processor operating according to an operating system program and an application program, the memory of the computer storing files in a directory structure, the directory structure organized according to conventions of the operating system, the computer-based apparatus comprising:

means for mapping the directory structure of the files stored in the memory to a real world hierarchical file structure of files and directories independent of conventions of the operating system; and means for displaying on the output device a save card to allow entry of information relating to the contents and location for a file in the real world hierarchical file structure whenever a command is executed to cause the application program to request information about a file to be saved.

19. In a computer system comprising a processor, a memory device and a monitor, the processor operating according to an application program and an operating system, a computer-implemented method for saving a file in the memory device, the computer-implemented method comprising:

(a) intercepting control from the application program whenever a save command is selected before a user can enter information on a save user interface of the application program;

(b) displaying on the monitor a save card;

(c) accepting information about the file on the save card;

(d) accepting information about a location at which the file is to be saved in a form independent of the form required by the operating system or the application program;

(e) storing the accepted information about the file and the location at which the file is to be saved in a form required by the operating system together in a database in the memory device; and (f) causing the file to be stored in the memory device.

20. The method of claim 19 wherein the step of accepting information about the file on the save card comprises accepting a user defined name for the file that is independent of operating system conventions.

21. In a computer system comprising a processor, a memory device and a monitor, the processor operating according to an application program and an operating system, a computer-implemented method for saving a file in the memory device, the computer-implemented method comprising:

(a) intercepting control from the application program whenever a save command is selected before a user can enter information on a save user interface of the application program;

(b) displaying on the monitor a save card;

(c) accepting information about the file on the save card;

(d) accepting information about a location at which the file is to be saved in a form independent of the form required by the operating system or the application program;

(e) determining a filename for the file according to operating system conventions;

(f) storing the accepted information about the file and the filename together in a database in the memory device; and (g) causing the file to be stored in the memory device according to the filename.

22. The method of claim 21 wherein the step of accepting information about the file on the save card comprises accepting a user defined name for the file that is independent of operating system conventions.

23. In a computer system comprising a processor, a memory device and a monitor, the processor operating according to an application program and an operating system, a computer-implemented method for retrieving a file saved in a location in the memory device, the file having an operating system filename, the computer-implemented method comprising:

(a) maintaining a database to map a location at which the file is saved in a form independent of the form required by the operating system or the application program to an operating system filename;

(b) intercepting control from the application program whenever an open command is selected by a user before the user can enter information on an open user interface of the application program;

(c) displaying an open card on the monitor;

(d) accepting information about the file on the open card;

(e) accepting on the open card information about the location at which the file is saved in a form independent of the form required by the operating system or the application program;

(f) accessing, utilizing the information about the location at which the file is saved in a form independent of the form required by the operating system or application program, the database to retrieve the operating system filename; and (g) causing the file to be retrieved from the memory device utilizing the operating system filename.

24. The method of claim 23 wherein the step of accepting information about the file on the open card comprises accepting a user defined name for the file that is independent of operating system filename conventions.

25. In a computer system comprising a processor, a memory device and a monitor, the processor operating according to an application program and an operating system, a computer-implemented method for retrieving a file from the memory device, the file having an operating system filename, the computer-implemented method comprising:

(a) maintaining a database to map information about the file to an operating system filename for the file;

(b) intercepting control from the application program whenever an open command is selected by a user before the user can enter information on an open user interface of the application program;

(c) displaying an open card on the monitor;

(d) accepting information about the file on the open card, the information accepted in a form independent of operating system conventions and application program conventions;

(e) retrieving from the database, using the accepted information as a search parameter, the operating system filename for the file; and (f) causing, utilizing the operating system filename, the file to be retrieved from the memory device.

26. The method of claim 25 wherein the step of accepting information about the file on the open card comprises accepting a user defined name for the file that is independent of operating system filename conventions.

27. In a computer system comprising a processor, a memory device and a monitor, the processor operating according to an application program and an operating system, a computer-implemented method for retrieving a file saved in a location in the memory device, the file having an operating system filename, the computer-implemented method comprising:

(a) intercepting control from the application program whenever an open command is selected by a user before the user can enter information under application program control about the file;

(b) displaying on the monitor an open card;

(c) accepting on the open card information about the location at which the file is saved in a form independent of the form required by the operating system or the application program;

(d) retrieving the operating system filename from a database in the memory device using information stored in the database relating to the location at which the file is saved; and (e) causing the file to be retrieved from the memory device utilizing the operating system filename.

28. In a computer system comprising a processor, a memory device and a monitor, the processor operating according to an application program and an operating system, a computer-implemented method for saving a file in and retrieving the file from the memory device, the computer-implemented method comprising:

(a) intercepting control from the application program whenever a save command is selected before a user can enter information on a save user interface of the application program;

(b) displaying a save card on the monitor;

(c) accepting information about the file on the save card;

(d) accepting information about a location at which the file is to be saved in a form independent of the form required by the operating system or the application program;

(e) determining a filename according to operating system conventions for the file;

(f) storing the accepted information about the file and the filename together in a database in the memory device;

(g) causing the file to be stored in the memory device;

(h) returning control to the application program;

(i) intercepting control from the application program whenever an open command is selected before the user can enter information on an open user interface of the application program;

(j) displaying an open card on the monitor;

(k) accepting information about the file on the open card;

(l) retrieving, using the accepted information as a search parameter, the operating system filename for the file from the database; and (m) causing the file to be retrieved from the memory device.

* * * * *